US012803722B2

(12) United States Patent
Xu

(10) Patent No.: US 12,803,722 B2
(45) Date of Patent: Nov. 17, 2026

(54) DATA TRANSMISSION METHODS AND DEVICES

(71) Applicant: Bin Xu, Nanjing (CN)

(72) Inventor: Bin Xu, Nanjing (CN)

(73) Assignee: Nanjing Zgmicro Company Limited, Nanjing (CN)

( * ) Notice: Subject to any disclaimer, the term of this patent is extended or adjusted under 35 U.S.C. 154(b) by 378 days.

(21) Appl. No.: 18/210,602

(22) Filed: Jun. 15, 2023

(65) Prior Publication Data

US 2023/0412321 A1 Dec. 21, 2023

(30) Foreign Application Priority Data

Jun. 15, 2022 (CN) ......................... 202210679637.2

(51) Int. Cl.
*H04L 47/34* (2022.01)
*H04L 1/1867* (2023.01)

(52) U.S. Cl.
CPC ............ *H04L 1/1867* (2013.01); *H04L 47/34* (2013.01)

(58) Field of Classification Search
None
See application file for complete search history.

(56) References Cited

U.S. PATENT DOCUMENTS

2013/0223345 A1* 8/2013 Asterjadhi ............ H04W 28/06 370/328
2015/0117176 A1* 4/2015 Jeon ...................... H04L 49/552 370/216

(Continued)

FOREIGN PATENT DOCUMENTS

CN 111800171 A 10/2020
WO 2019129147 A1 7/2019

OTHER PUBLICATIONS

First Office Action and search report received for Chinese Application No. 202310260758.8, dated Dec. 27, 2025.

(Continued)

*Primary Examiner* — Benjamin Lamont
(74) *Attorney, Agent, or Firm* — Zhong Law, LLC

(57) ABSTRACT

The present invention discloses a data transmission method, and a data transmission device, which relates to the field of wireless communication technology to solve the problem of low reliability in audio data transmission. The data transmission method is applied to a first device and comprises: receiving a first data group transmitted by a second device during a first time interval, the first data group comprising a first initial data group and/or a first retransmission data group, wherein the first initial data group comprises one or more first data packets that have not been transmitted by the second device before the first time interval, and the first retransmission data group comprises one or more second data packets comprising at least a portion of one or more data packets transmitted by the second device before the first time interval that were not successfully received by the first device; generating a target mapping table based on a reception status of the first data group and a reception status of the data packets transmitted by the second device before the first time interval, wherein the reception status comprises a failed reception; and transmitting the target mapping table to the second device within the first time interval. In this way, the reliability of the audio data transmission can be improved.

15 Claims, 4 Drawing Sheets

(56) References Cited

U.S. PATENT DOCUMENTS

| | | | | |
|---|---|---|---|---|
| 2019/0036651 | A1* | 1/2019 | Chitrakar | H04L 1/1832 |
| 2021/0091887 | A1* | 3/2021 | Cho | H04L 1/0061 |
| 2021/0376969 | A1* | 12/2021 | Xie | H04L 1/1896 |
| 2022/0200716 | A1* | 6/2022 | Bonde | H04H 20/89 |
| 2023/0239076 | A1* | 7/2023 | Xu | H04L 1/1896 370/328 |
| 2023/0318790 | A1* | 10/2023 | Fujimori | H04L 1/1635 370/329 |

OTHER PUBLICATIONS

Second Office Action received for Chinese Application No. 202310260758.8, dated May 14, 2026.

* cited by examiner

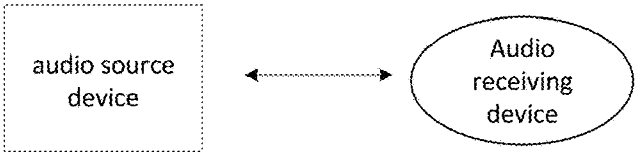
FIG. 7
| packet header | | | | | | | | | | | | |
|---|---|---|---|---|---|---|---|---|---|---|---|---|
| LLID (2 bits) | NESN (1 bit) | SN (1 bit) | CIE (1 bit) | BTE (1 bit) | NPI (1 bit) | EBAE (1 bit) | Length (8 bits) | BTN (4 bits) | BTSN (4 bits) | PDUSN (8 bits) | STARTSN (8 bits) | MT (40 bits) |
FIG. 8
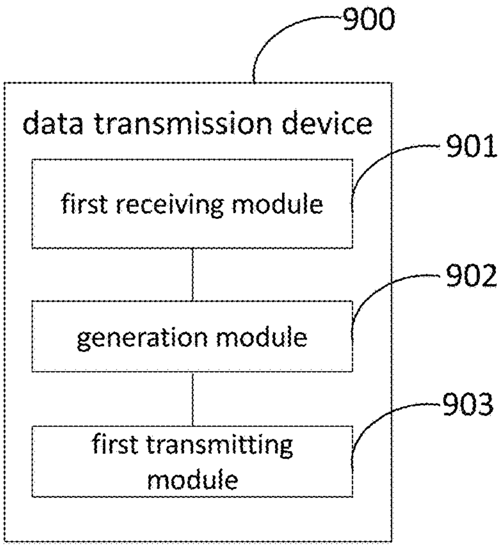
FIG. 9
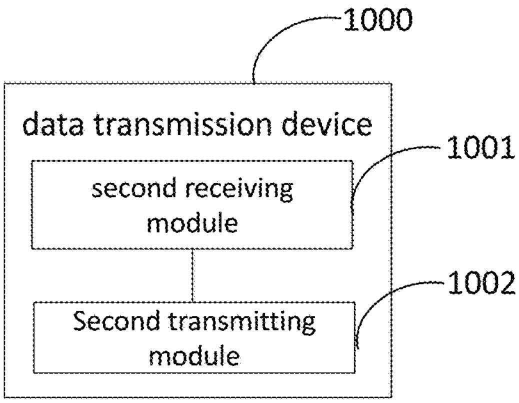
FIG. 10

DATA TRANSMISSION METHODS AND DEVICES

CROSS-REFERENCE OF RELATED APPLICATIONS

The present invention claims priority of Chinese Patent Application No. 202210679637.2 filed in China on Jun. 15, 2022, the entire contents of which are incorporated herein by reference.

BACKGROUND OF THE INVENTION

Field of the Invention

The present invention relates to the field of wireless communication technology, and in particular to a data transmission method, a data transmission device, and an electronic device.

Description of the Related Art

With continuous development of wireless transmission technology, higher requirements for efficiency and reliability of wireless audio transmission are being demanded. Bluetooth Low Energy Audio (BLE Audio) technology based on Connected Isochronous Stream (CIS) link and Connected Isochronous Group (CIG) protocol introduce various wireless audio services with lower power consumption, lower cost, and higher quality.

During the transmission of audio data, an audio source device usually continuously transmits audio data to a receiving device in multiple consecutive time intervals. In each time interval, the receiving device transmits an acknowledgement message to the audio source device so that the audio source device can confirm a reception status of audio data by the receiving device during a current time interval.

However, the audio source device may not receive the acknowledgement message successfully due to interference, thus preventing the audio source device from retransmitting unsuccessfully received audio data in a timely manner, which in turn results in less reliable audio data transmission.

SUMMARY OF THE INVENTION

The purpose of the present invention is to provide a data transmission method, a data transmission device and related equipment to solve at least the problem of low reliability of audio data transmission.

To achieve the purpose, according to one aspect of the present invention, a data transmission method is provided. The data transmission method is applied to a first device. The data transmission method comprises: receiving a first data group transmitted by a second device during a first time interval, the first data group comprising a first initial data group and/or a first retransmission data group, wherein the first initial data group comprises one or more first data packets that have not been transmitted by the second device before the first time interval, and the first retransmission data group comprises one or more second data packets comprising at least a portion of one or more data packets transmitted by the second device before the first time interval that were not successfully received by the first device; generating a target mapping table based on a reception status of the first data group and a reception status of the data packets transmitted by the second device before the first time interval, wherein the reception status comprises a failed reception; and transmitting the target mapping table to the second device within the first time interval.

According to another aspect of the present invention, a data transmission method is provided. The data transmission method is applied to a second device. The data transmission method comprises: receiving a target mapping table from a first device, the target mapping table being generated based on a reception status of a first data group and a reception status of one or more data packets transmitted by the second device before a first time interval, the reception status comprising a failed reception; transmitting a second data group to the first device during a second time interval being after the first time interval, the second data group comprising a second initial data group and/or a second retransmission data group, wherein the second initial data group comprises one or more third data packets that have not been transmitted by the second device before the second time interval, the second retransmission data group comprises one or more fourth data packets comprising at least some of the data packets transmitted by the second device which were not successfully received by the first device before the second time interval and/or at least some of the data packets of the first data group which were not successfully received by the first device.

According to still another aspect of the present invention, a data transmission device used as a first device is provided. The data transmission device comprises: a first receiving module configured for receiving a first data group transmitted by a second device during a first time interval, the first data group comprising a first initial data group and/or a first retransmission data group, wherein the first initial data group comprises one or more first data packets that have not been transmitted by the second device before the first time interval, and the first retransmission data group comprises one or more second data packets comprising at least a portion of one or more data packets transmitted by the second device before the first time interval that were not successfully received by the first device; a generation module configured for generating a target mapping table based on a reception status of the first data group and a reception status of the data packets transmitted by the second device before the first time interval, wherein the reception status comprises a failed reception; and a first transmitting module configured for transmitting the target mapping table to the second device within the first time interval.

In the present invention, the first device receives the first data group transmitted by the second device during the first time interval, and generates a target mapping table based on the reception status of the first data group and the reception status of the data packets transmitted by the second device before the first time interval, and transmits the target mapping table to the second device during the first time interval. With the above settings, the target mapping table generated by the first device can represent not only the reception status of the data packets in the current time interval, but also the reception status of the data packets in the previous time interval. If the target mapping table transmitted by the first device is not successfully received by the second device in any time interval, the second device can still confirm the reception status of the data packets based on the target mapping table transmitted by the first device in the subsequent time interval, so that the second device can retransmit the received failed data packet based on the reception status of each data packet to improve the reliability of audio data transmission.

There are many other objects, together with the foregoing attained in the exercise of the invention in the following description and resulting in the embodiment illustrated in the accompanying drawings.

BRIEF DESCRIPTION OF THE DRAWINGS

These and other features, aspects, and advantages of the present invention will become better understood with regard to the following description, appended claims, and accompanying drawings wherein:

FIG. 7 is a block diagram of a wireless audio transmission system applicable to embodiments of the present invention;

FIG. 8 is a schematic diagram of a format of a EBA PDU extended packet header provided according to one embodiment of the present invention;

FIG. 9 is a first structural diagram of the data transmission device provided according to one embodiment of the present invention;

FIG. 10 is a second structure diagram of the data transmission device provided according to one embodiment of the present invention.

DETAILED DESCRIPTION OF THE PREFERRED EMBODIMENTS

The detailed description of the invention is presented largely in terms of procedures, operations, logic blocks, processing, and other symbolic representations that directly or indirectly resemble the operations of data processing devices that may or may not be coupled to networks. These process descriptions and representations are typically used by those skilled in the art to most effectively convey the substance of their work to others skilled in the art.

Reference herein to "one embodiment" or "an embodiment" means that a particular feature, structure, or characteristic described in connection with the embodiment can be comprised in at least one embodiment of the invention. The appearances of the phrase "in one embodiment" in various places in the specification are not necessarily all referring to the same embodiment, nor are separate or alternative embodiments mutually exclusive of other embodiments. Further, the order of blocks in process flowcharts or diagrams representing one or more embodiments of the invention do not inherently indicate any particular order nor imply any limitations in the invention.

Figure 1:
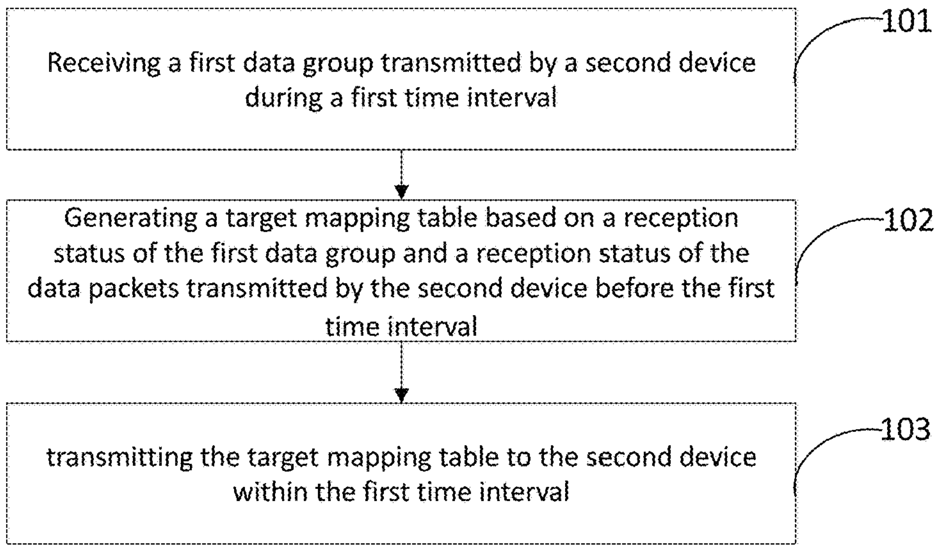
FIG. 1 is a first flowchart of a data transmission method provided according to one embodiment of the present invention.

FIG. 1 is a first flowchart of a data transmission method provided according to one embodiment of the present invention. As shown in FIG. 1, the data transmission method provided according to one embodiment of the present invention is applied to a first device. The data transmission method comprises the following operations.

At 101, a first data group transmitted by a second device is received during a first time interval. The first data group comprises a first initial data group and/or a first retransmission data group. The first initial data group comprises one or more first data packets. The first data packets are the data packets that have not been transmitted by the second device before the first time interval. The first retransmission data group comprises one or more second data packets. The second data packets comprises at least a portion of one or more data packets transmitted by the second device before the first time interval that were not successfully received by the first device.

At 102, a target mapping table is generated based on a reception status of the first data group and a reception status of the data packets transmitted by the second device before the first time interval. The reception status comprises a failed reception.

At 103, the target mapping table is transmitted to the second device within the first time interval.

The data transmission method can be used for different types of data transmission. For example, in one embodiment, the data transmission method provided according to one embodiment of the present invention can be used for transmission of audio data or video data. In one embodiment, the first device may be used as a data receiver and the second device may be used as a data sender. Of course, in a specific implementation, the data can be transmitted in both directions, i.e., both the first device and the second device may transmit data and receive data.

It should be noted that during the data transmission, both the first device and the second device can transmit data in a plurality of consecutive time intervals. In this embodiment, the first time interval can be any one of the plurality of time intervals.

The first device receives the first data group transmitted by the second device during the first time interval. In a first case, the first device receives the first initial data group transmitted by the second device during the first time interval. In a second case, the first device receives the first retransmission data group transmitted by the second device during the first time interval. In a third case, the first device receives the first initial data group and the first retransmission data group transmitted by the second device during the first time interval. It should be noted that the data packet transmitted by the second device carries data.

The first initial data group comprises one or more first data packets, and the number of the first data packets may be any number. The first retransmission data group comprises one or more second data packets, and the number of the second data packets may be any number. Thus, the first device receives the first data group transmitted by the second device during the first time interval may also be understood as the first device receives at least one first data packet and/or at least one second data packet transmitted by the second device during the first time interval.

The first data packets being the data packets that has not been transmitted by the second device before the first time interval mean that the first data packet is a data packet transmitted by the second device to the first device for the first time, or the first data packet carries data transmitted by the second device to the first device for the first time.

For ease of description, in subsequent embodiments, the data packets that were not successfully received by the first device in the data packets transmitted by the second device before the first time interval are referred to as received failed data packets. The second data packet comprises at least one of the received failed data packets means that one data packet that the second device had transmitted to the first device before the first time interval but was not successfully received by the first device, and thus the data packet can be retransmitted as one second data packet during the first time interval. The number of received failed data packets may be one or more. When the number of received failed data packets is more than one, the second device may retransmit at least some of the received failed data packets as the second data packets within the first time interval.

For ease of understanding, a specific embodiment will be described below as an example. Assume that a time interval 1 is any one time interval, a time interval 2 is a time interval after and adjacent to the time interval 1, and the time interval 3 is a time interval after and adjacent to the time interval 2.

In this embodiment, the second device transmits 5 first data packets, recorded as 5 data packets A, to the first device in sequence during the time interval 1, wherein 2 of the 5 data packets A are not successfully received by the first device.

In one embodiment, the second device can transmit 5 new first data packets and 2 second data packets to the first device within the time interval 2. The 5 new first data packets herein are recorded as 5 data packets B, and refer to the first data packets for the time interval 2, i.e., the data packets that have not been transmitted before the time interval 2. The 2 second data packets herein refer to the second data packets for the time interval 2, i.e., the 2 data packets A that were not successfully received by the first device during the time interval 1.

In other embodiments, the second device may transmit 5 data packets B and 1 second data packet to the first device during the time interval 2. Here, the 1 second data packet may be any one of the 2 data packets A that were not successfully received by the first device during the time interval 1.

In other embodiments, the second device may transmit only 5 data packets B to the first device during the time interval 2 and then retransmit any one of the 2 data packets A that were not successfully received by the first device during the time interval 1 to the first device during the time interval 3 or any one or more time intervals after the time interval 3.

In other embodiments, the second device may transmit only 1 or 2 second data packets to the first device during the time interval 2, wherein the 1 or 2 second data packets are 1 or 2 data packets A of the 2 data packets A that were not successfully received by the first device during the time interval 1.

It should be noted that the number of first data packets transmitted by the second device in different time intervals is not limited here, and the number of second data packets transmitted by the second device in different time intervals is not limited here. In a specific implementation, the second device may determine at least some of the data packets that are retransmitted as the second data packets in the present time interval from the received failed data packets based on any strategy.

The first device performs the operation of receiving the first data group. However, depending on the actual situation, the first device may successfully receive all data packets in the first data group, or may only successfully receive some data packets in the first data group, or even not successfully receive any data packets in the first data group. In the time interval before the first time interval, there may also be situations where the first device cannot successfully receive data packets transmitted by the second device.

Therefore, the first device generates the target mapping table based on the reception status of each data packet within the first data group and the reception status of the data packets transmitted by the second device before the first time interval. Specifically, the target mapping table may be used to represent the reception status of the data packets within the first data group and the reception status of the data packets transmitted by the second device to the first device during at least one time interval before the first time interval.

In this embodiment, the reception status comprises a failed reception, and thus the target mapping table may be used to represent the reception status of one data packet that were not successfully received or failed to be received in the first data group, and the reception status of one data packet that were not successfully received or failed to be received during at least one time interval before the first time interval.

It is noted that since the first data packet is the data packet that has not been transmitted by the second device before the first time interval, the reception status of the first data packet is the reception status of the first data packet during the first time interval.

The reception status of the received failed data packet before the first time interval is the failed reception. The second data packet comprises at least some of the received failed data packets. In one case, the received failed data packet is retransmitted as the second data packet by the second device to the first device within the first time interval and then is successfully received by the first device. In this case, the reception status of the received failed data packet is no longer the failed reception. In a second case, the received failed data packet is retransmitted as the second data packet by the second device to the first device within the first time interval, but is still not successfully received by the first device. In the second case, the reception status of the received failed data packet is still the failed reception. In the third case, the received failed data packet is not retransmitted as the second data packet by the second device to the first device within the first time interval. In the third case, the reception status of the received failed data packet is still the failed reception. After generating the target mapping table, the first device transmits the target mapping table to the second device within the first time interval.

In one embodiment of the present invention, the first device receives the first data group transmitted by the second device within the first time interval, and generates the target mapping table based on the reception status of the first data group and the reception status of the data packet transmitted by the second device before the first time interval, and transmits the target mapping table to the second device within the first time interval. With the above settings, the target mapping table generated by the first device can represent not only the reception status of the data packets in the current time interval, but also the reception status of the data packets in the previous time interval. In the event that the target mapping table transmitted by the first device is not successfully received by the second device in any time interval, the second device can still confirm the reception status of the data packet based on the target mapping table transmitted by the first device in the subsequent time interval, so that the second device can retransmit the received failed data packet based on the reception status of each data packet to improve the reliability of data transmission.

In one embodiment, the reception status further comprises a successful reception. The target mapping table may represent the successful reception or failed reception of the data packet. In another embodiment, the first device transmits an acknowledgement packet to the second device within the first time interval, wherein a packet header of the acknowledgement packet comprises the target mapping table.

For example, the first device transmits the acknowledgment packet to the second device within the first time interval, wherein the packet header of the acknowledgment packet may represent the reception status of the data packet within the first data group and the reception status of the data packet transmitted by the second device to the first device during at least one time interval before the first time interval.

In this embodiment, the reception status also comprises the successful reception, and thus the target mapping table may be used to represent the reception status of the data packets with the successful reception and the failed reception within the first data group, as well as the reception status of the data packets with the successful reception and the failed reception during at least one time interval before the first time interval.

For ease of understanding, a specific embodiment will be illustrated below. In this embodiment, the packet header of the acknowledgment packet comprises a plurality of bits. The reception status of each data packet occupies one of the bits. In the case that one bit is set to 1, the reception status of the data packet corresponding to the one bit can be considered as the successful reception. In the case that one bit is set to 0, the reception status of the data packet corresponding to the one bit can be considered as the failed reception.

In one alternative embodiment, it is also possible to consider the reception status of the data packet corresponding to one bit to be the failed reception if the one bit is set to 1, and to consider the reception status of the data packet corresponding to one bit to be the successful reception if the one bit is set to 0.

In one embodiment of the present invention, the first device transmits the acknowledgement packet to the second device within the first time interval, and the packet header of the acknowledgement packet comprises the target mapping table. By the above setting, the second device can determine the reception status of the first data group and the reception status of the data packets transmitted by the second device before the first time interval based on the packet header of the acknowledgement packet, which improves the convenience and efficiency of the second device in confirming the reception status of the data packets, thereby improving the efficiency of data transmission.

In one embodiment, each data packet transmitted by the second device to the first device is provided with a first sequence number. The first sequence number is determined based on a chronological order in which the data packet was first transmitted by the second device. The packet header of the acknowledgement packet comprises a first region. The first region is configured to represent whether the first device confirms the reception status of the data packets to the second device by an extended block acknowledgement (EBA) within a current time interval.

When the first device confirms the reception status of the data packet to the second device by the extended block acknowledgement within the current time interval, the packet header of the acknowledgement packet further comprises: a second region configured to represent a target sequence number; a third region configured to represent the reception status of the data packets in an ascending order of the first sequence number from the target sequence number. The target sequence number is a minimum value of the first sequence numbers corresponding to the data packets whose reception status is the failed reception.

The first region is configured to represent whether the first device confirms the reception status of the data packets to the second device by the extended block acknowledgement (EBA) within a current time interval. The confirming the reception status of the data packets by the extended block acknowledgement (EBA) mean that the first device confirms both the reception status of the data packets transmitted by the second device in the current time interval and also the reception status of the data packets transmitted by the second device in the time intervals before the current time interval.

In one embodiment, the first region may also be configured to represent whether an Extended Block Acknowledgement Enable (EBAE) function is enabled. For example, when the first region is assigned a value of 1, it indicates that the EBAE function is enabled. When the first region is assigned a value of 0, it indicates that the EBAE function is not enabled. In the specific implementation, the first region occupies 1 bit.

When the first device confirms the reception status of the data packet to the second device by the extended block acknowledgement within the current time interval, the packet header of the acknowledgement packet further comprises: a second region and a third region. At this time, it can be considered that bytes corresponding to the second area and the third area need to be added to the packet header of the acknowledgement packet.

The second region is configured to represent the target sequence number. The target sequence number is a minimum value of the first sequence numbers corresponding to the data packets whose reception status is the failed reception. The target sequence number may also be referred to as a Start Sequence Number (STARTSN).

The third region is configured to represent the reception status of the data packets in the ascending order of the first sequence number from the target sequence number. Specifically, the third area represents the reception status of each data packet whose the first sequence number is greater than the target serial number from small to large. In one embodiment, the third region can also be considered as the target mapping table, or is called the Mapping Table (MT).

In a specific implementation, the third region may comprise a plurality of bits, wherein the reception status of each data packet occupies one bit in the third region and the value of the bit represents the reception status of the data packet. In one embodiment, a lowest bit of the third region is used to indicate the reception status of the data packet corresponding to the target sequence number, a higher bit of the third region indicates the reception status of the data packet having a higher first sequence number accordingly, and two adjacent bits of the third region indicate the reception status of the two data packets with adjacent first sequence numbers, respectively. That is, in the order of the bits from lowest to highest, and the first sequence number from smallest to largest, the reception status of each data packet with the first sequence number greater than or equal to the target sequence number is reflected in the corresponding bit. The highest first sequence number that can be indicated by the third region is determined by the target sequence number and the number of bits in the third region.

In one embodiment, if the value of one bit in the third region is set to 1, it can be considered that the reception status of the data packet corresponding to the one bit in the third region is the failed reception, or it indicates that the data packet needs to be retransmitted. If the value of one bit in the third region is set to 0, it can be considered that the reception status of the data packet corresponding to the one bit in the third region is the successful reception, or it indicates that the data packet does not need to be retransmitted.

After the data packet represented by the first sequence number starting from the target sequence number is successfully received by the first device, the value of its corresponding bit in the third area can be set to 0, i.e., the second device does not need to retransmit the data packet represented by the first sequence number.

In the above embodiment, a default value of the lowest bit of the MT may be set to 1, i.e., the first device needs the second device to transmit or retransmit the data packet with the smallest first sequence number STARTSN. STARTSN may represent the data packet transmitted in the current time interval or the data packet transmitted in the last one or more time interval. If the data packets transmitted in the current time interval and the time interval before the current time interval are correctly received, then STARTSN represents the first sequence number corresponding to the first data packet to be transmitted in the next time interval.

It should be noted that in this embodiment, the data packet corresponding to the first sequence number less than the target sequence number does not occupy the bits in the MT, so its reception status can be directly defaulted to be the successful reception, i.e., there is no need for the second device to retransmit the data packet. In this way, the second device can know that the data packet with the first sequence number less than the target sequence number has been successfully received according to the target sequence number; can confirm the reception status of each data packet with the first sequence number greater than or equal to the target sequence number in turn according to the target sequence number and the value of each bit in the MT.

It can be understood as that, the packet header of the acknowledgment packet transmitted by the first device may also not comprise the second region and the third region when the extended block acknowledgment function is not used. That is, the reception status of the data packets transmitted by the second device during the current time interval may be represented by other forms of the target mapping table in other regions of the acknowledgment packet.

For ease of understanding, a specific embodiment will be illustrated below as an example. Assume that a time interval 1 is the first time interval and a time interval 2 is the time interval after and adjacent to the time interval 1.

In this embodiment, the second device transmits 5 first data packets to the first device in the time interval 1, and the first sequence numbers of these 5 first data packets are 0, 1, 2, 3, 4 in order. Among them, 3 first data packets with the first sequence numbers 0, 1, 4 are successfully received by the first device, while 2 first data packets with the first sequence numbers 2, 3 are not successfully received by the first device.

According to the above, it is known that the first sequence number corresponding to the data packets whose the reception status is the failed reception is 2, 3, and the target sequence number is 2 at this time. Therefore, the first region represents the first device confirms the reception status of the data packets to the second device by the extended block acknowledgement within the current time interval, and therefore the packet header of the acknowledgement packet comprises the second region and the third region. The target sequence number represented by the second region is 2. The third region sequentially represents the reception status corresponding to the data packets with the first sequence number 2, 3, and 4. Specifically, the data packets with the first sequence number 2, 3 and 4 occupy the three adjacent bits in the MT from the lowest bit, which are used to represent the reception status of the data packets with the first sequence number 2, 3 and 4, respectively. The values of the two bits corresponding to the first sequence number 2 and 3 are set to 1, and the value of the bit corresponding to the first sequence number 4 in the MT is set to 0. The data packets with the first sequence number 0 and 1 do not occupy the bits in the MT, it can be defaulted that the data packets with the first sequence number 0 and 1 have been received successfully.

The second device transmits 5 new first data packets and 2 second data packets to the first device in turn within the time interval 2. The first sequence numbers of the 5 first data packets transmitted within the time interval 2 are 5, 6, 7, 8, 9 in order. Therefore, the first sequence numbers of the data packets transmitted by the second device within the time interval 2 are 2, 3, 5, 6, 7, 8, 9 in order. The data packets with the first sequence numbers of 2, 5, 6, 8 are successfully received by the first device, and the data packets with the first sequence numbers 3, 7, 9 are not successfully received by the first device.

According to the above, it is known that the first sequence numbers corresponding to the data packets with the reception status of failed reception are 3, 7, 9. Therefore, the target sequence number is 3 at this time. The first region represents the first device confirms the reception status of the data packets to the second device by the extended block acknowledgement within the current time interval, and therefore the packet header of the acknowledgement packet comprises the second region and the third region. The target sequence number represented by the second region is 3 and the third region sequentially represents the reception status corresponding to the data packets with the first sequence number 3, 4, 5, 6, 7, 8, 9. Specifically, the value of the three bits in the MT corresponding to the first sequence number 3, 7, and 9 is set to 1, the value of the bits in the MT corresponding to the first sequence number 4, 5, 6, and 8 is set to 0, and the data packets with the first sequence number 0, 1, and 2 does not occupy the bits in the MT because the data packets with the first sequence number less than the target sequence number 3 have been received successfully by default.

In the embodiment of the present invention, the packet header of the acknowledgment packet comprises the first region configured to represent whether the first device confirms the reception status of the data packets to the second device by an extended block acknowledgement within the current time interval. When the first device confirms the reception status of the data packet to the second device by the extended block acknowledgement within the current time interval, the packet header of the acknowledgement packet further comprises the second region and the third region. By the setting of the second region and the third region, the data packets corresponding to the first sequence number smaller than the target sequence number do not occupy the bits of the third region, thereby increasing the number of data packets that can be represented by the third region. At the same time, in the case that the first device has not confirmed the reception status of the data packet to the second device by the extended block acknowledgement within the current time interval, the packet header of the acknowledgment packet does not comprise the second region and the third region, thereby reducing the length of the packet header of the acknowledgment packet and simplifying a structure of the packet header of the acknowledgment packet.

In one embodiment, the first device communicates wirelessly with the second device based on an Extended Block Acknowledgement (EBA) link.

The packet header of the acknowledgement packet is generated based on a Bluetooth Low Energy (BLE) Connected Isochronous Stream (CIS) Protocol Data Unit (PDU). The packet header of the acknowledgement packet further comprises: a Logical Link Identifier (LLID) configured to identify the load type of this data packet; a Close Isochronous Event (CIE) identifier configured to identify whether or not the Close Isochronous Event is closed; a Null PDU Indicator (NPI) indicator, configured to identify whether this data packet carries data; a Load Length (Length) identifier configured a load length of this data packet.

It should be noted that the first device communicates with the second device wirelessly based on the EBA link can be understood as that both the first device transmitting the target mapping table to the second device and the first device transmitting the data packet to the second device are based on the EBA link.

It should be understood that the acknowledgement packet being generated based on the BLE CIS PDU, and since the first device communicates with the second device wirelessly based on the EBA link, the data packet transmitted by the first device can also be called EBA PDU. EBA PDU has the same structure as BLE CIS PDU but with a different packet header format, i.e. EBA PDU is a CIS PDU with an Extended Header.

The specific method of the acknowledgement packet being generated based on the BLE CIS PDU is not limited here. For example, in one embodiment, based on the packet header of the BLE CIS PDU, the EBA PDU uses a reserved field (Reserved for Future Use, RFU) in the packet header of the BLE CIS PDU as the first region, and when the first region indicates that the first device confirms the reception status of the data packet to the second device by the extended block acknowledgement within the current time interval, bytes are added to the packet header of the BLE CIS PDU to be used as the second region and the third region.

In the specific implementation, similar to the BLE CIS PDU, the types of EBA PDUs can be considered to comprise the first type and the second type. The first type of EBA PDUs carry data such as audio or video, and the second type of EBA PDUs do not carry data such as audio or video. The first type of EBA PDUs can be called EBA Data PDUs, and the second type of EBA PDU can be called EBA Null PDU.

Since the packet header of the acknowledgement packet is used to confirm the reception status of the data packet to the second device by the EBA, the acknowledgement packet does not carry data such as audio or video, so the acknowledgement packet generated based on the BLE CIS PDU can be considered one EBA Null PDU.

In one embodiment, the first device communicates with the second device wirelessly based on the EBA link, and the acknowledgement packet being generated based on the BLE CIS PDU. With the above settings, the EBA link can be considered as the CIS link that enables the EBA function.

In one embodiment, after 103, the method further comprises: performing a first Pre-Retransmission (PRT) operation. The first pre-retransmission operation comprises retransmitting the target mapping table at least once to the second device.

The PRT technique can be understood as pre-retransmitting at least some of the data at least two or more times during the current time interval using redundant time slots to improve the reliability of the data transmission. Specifically, in this embodiment, after 103, the first device performs the first pre-retransmission operation can be understood as retransmitting the target mapping table to the second device at least once after the first device transmits the target mapping table to the second device within the first time interval. Since the first device transmits the target mapping table at least twice within the first time interval, the probability of the second device successfully receiving the target mapping table in the case of poor wireless channel quality can be improved, thereby improving the transmission reliability of the target mapping table.

Figure 2:
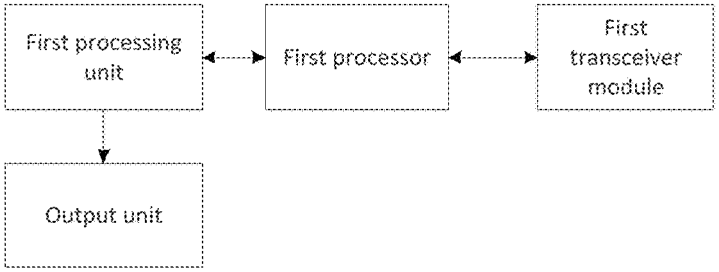
FIG. 2 is a block structure diagram of an exemplary first device according to one embodiment of the present invention.

In one embodiment, the operation 101 further comprises: receiving all data packets in the first data group transmitted by the second device during a first time period in the first time interval; receiving one or more data packets retransmitted by the second device during a second time period in the first time interval, wherein the retransmitted data packets is at least some of the data packets in the first data group; determining the reception status of the first data group based on the data packets received during the first time period and the data packets received during the second time period. The first time period precedes the second time period FIG. 2 is a block structure diagram of a first device provided according to one embodiment of the present invention. As shown in FIG. 2, the first device provided according to one embodiment of the present invention comprises a first processing unit, a first transceiver module, and a first processor.

In this embodiment, the first processor is configured to execute the relevant protocols, process the data packets received by the first transceiver module from the second device, and transmit the data carried by the data packets to the first processing unit. The first processor is also configured to generate the target mapping table based on the reception status of the data packets and transmit the target mapping table to the second device via the first transceiver module. The first processing unit is configured to post-process the data, which may be carried by the data packet transmitted by the second device. The first transceiver module is used for transmitting and receiving wireless signal, which specifically comprises receiving data packets and transmitting data packets.

For ease of understanding, the following will take the transmitted data as audio data for example. As shown in FIG. 2, the first processor is used for the associated protocols, such as the BLE protocol associated with BLE Audio, and/or the protocol for the link over which the first device and the second device communicate wirelessly. At the same time, the first processor is also used to process the data packets received by the first transceiver module from the second device and transmit the audio data carried therein to the first processing unit; generate an acknowledgement packet carrying the target mapping table based on the reception status of the data packets and transmit the acknowledgement packet to the second device via the first transceiver module. The first processing unit is used to post-process the audio data transmitted by the second device such as decoding and sound effect processing, and output the processed audio data to an output unit. The output unit is an audio output unit for converting the audio signal into a sound signal. The first transceiver module is used for transmitting and receiving BLE wireless signal, specifically including receiving data packets and transmitting data packets.

Figure 3:
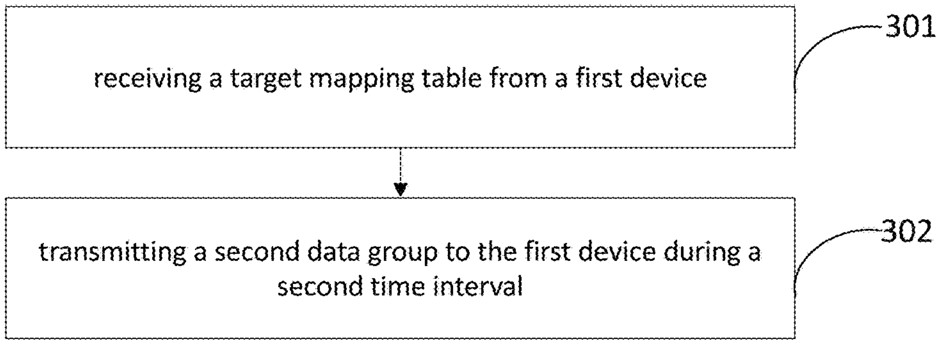
FIG. 3 is a second flowchart of a data transmission method provided according to one embodiment of the present invention.

FIG. 3 is a second flowchart of the data transmission method provided according to one embodiment of the present invention. As shown in FIG. 3, the data transmission method can be applied to a second device, and comprises the following operations.

At 301, the target mapping table from the first device is received by the second device. The target mapping table is generated based on a reception status of a first data group and a reception status of data packets transmitted by the second device before a first time interval, wherein the reception status comprises a failed reception.

At 302, a second data group is transmitted to the first device during a second time interval by the second device. The second time interval is after the first time interval. The second data group comprises a second initial data group and/or a second retransmission data group, wherein the second initial data group comprises one or more third data packets that have not been transmitted by the second device before the second time interval, the second retransmission data group comprises one or more fourth data packets comprising at least some of the data packets transmitted by the second device which were not successfully received by the first device before the second time interval and/or at least some of the data packets of the first data group which were not successfully received by the first device.

After the target mapping table has been successfully received, the second device may determine the reception status of each data packet transmitted by the second device based on the target mapping table, and thus determine the data packets transmitted during the time interval after the first time interval based on the target mapping table.

In one embodiment, the second time interval is after the first time interval may mean that the second time interval is a time interval after the first time interval that is adjacent to the first time interval. In other embodiment, the second time interval is after the first time interval may mean that the second time interval is any time interval after the first time interval.

The second time interval being any one time interval after the first time interval may be understood to mean that the data packets transmitted by the second device during the time interval adjacent to the first time interval after the first time interval may not be determined based on the target mapping table.

It is noted that for a plurality of consecutive time intervals, the second time interval may also be considered to be the first time interval corresponding to the time interval after it. For any one time interval, its corresponding data packet that has not been transmitted before that time interval is different from the other time intervals. Similarly, for either time interval, the corresponding received failed data packets may also be different from the other time intervals.

In one embodiment of the present invention, the second device receives the target mapping table from the first device and transmits the second data group to the first device during the second time interval. The data packet included in the second data group can be determined based on the target mapping table. With the above settings, the target mapping table generated by the first device may represent not only the reception status of data packets during the current time interval, but also the reception status of data packets during the previous time interval. The second device can still confirm the reception status of the data packets transmitted in the current time interval and the previous time interval based on the target mapping table transmitted by the first device, so that the second device can retransmit the received failed data packets to improve the reliability of data transmission.

In one embodiment, a packet header of a data packet transmitted by the second device comprises a fourth region. The fourth region is configured to represent whether the second device is transmitting one or more data packets to the first device in a block transmission during a current time interval. In other words, the fourth region is configured to represent whether a Block Transmission Enable (BTE) function is enabled. In the present invention, the block transmission means transmitting multiple data packets at one time.

When the second device transmits the data packets in the block transmission to the first device at the current time interval, each data packet transmitted by the second device at the current time interval further comprises at least one of: a fifth region configured for representing a total number of data packets transmitted by the second device during the current time interval; a six region configured for representing a first sequence number of this data packet; a seventh region configured to represent a second sequence number of this data packet. The first sequence number is determined based on a chronological order in which this data packet was first transmitted by the second device, and the second sequence number is determined based on a chronological order in which this data packet was transmitted during the current time interval.

In one embodiment, the fourth region may represent whether a Block Transmission Enable (BTE) function is enabled. For example, the BTE is assigned a value of 1 to enable the BTE function, namely the second device transmits a plurality of data packets to the first device in the block transmission during the current time interval. The BTE is assigned a value of 0 to untenable the BTE function. In specific implementations, the fourth region occupies 1 bit.

When the second device transmits the data packets to the first device in the block transmission at the current time interval, namely, the BTE function is enabled, each data packet transmitted by the second device at the current time interval also comprises at least one of the fifth region, the sixth region and the seventh region. At this time, bytes corresponding to at least one of the fifth region, the sixth region and the seventh region need to be added to the packet header of the data packet.

The fifth region is used to represent the total number of data packets transmitted by the second device during the current time interval. In one embodiment, the fifth region may also be referred to as the total number (namely, Block Transmission Number, BTN) of data packets transmitted in the block transmission during the current time interval.

The sixth region is used to represent the first sequence number of this data packet. In one embodiment, the first sequence number may also be referred to as the sequence number (namely, PDU Sequence Number, PDUSN) of data packets transmitted by the second device.

The seventh region is used to represent the second sequence number of this data packet. In one embodiment, the second sequence number may also be referred to as the Block Transmission Sequence Number (BTSN) of the data packets transmitted in the block transmission during the current time interval.

When the second device transmits the data packets in the block transmission to the first device at the current time interval, each data packet transmitted by the second device at the current time interval also comprises at least one of a fifth region, a sixth region, and a seventh region. The setting of the fifth, sixth and seventh regions enables the first device to confirm the total number of data packets transmitted by the second device during the current time interval, the first sequence number of the data packet and the second sequence number of the data packet by the packet header, so as to determine the reception status of the data packet based on these parameters.

When the second device does not transmit the data packets in the block transmission to the first device at the current time interval, each data packet transmitted by the second device at the current time interval may not comprise the fifth region, the sixth region, and the seventh region, thereby reducing the length of the packet header and simplifying the structure of the packet header.

In one embodiment, the first device communicates wirelessly with the second device based on an EBA link. The data packets transmitted by the second device are generated based on BLE CIS PDU. The packet header of each data packets transmitted by the second device further comprises: a Logical Link Identifier (LLID) identifier configured to identify the load type of this data packet; a Close Isochronous Event (CIE) identifier configured to identify whether or not the Close Isochronous Event is closed; a Null PDU Indicator (NPI) indicator, configured to identify whether this data packet carries data; a Load Length (Length) identifier configured a load length of this data packet.

It should be noted that the first device communicates with the second device wirelessly based on the EBA link can be understood as that both the first device transmitting the target mapping table to the second device and the first device transmitting the data packet to the second device are based on the EBA link.

It should be understood that the data packet is generated based on the BLE CIS PDU, and since the first device communicates with the second device wirelessly based on the EBA link, the data packet transmitted by the second device can also be called EBA PDU. EBA PDU has the same structure as BLE CIS PDU but with a different packet header format, i.e. EBA PDU is a CIS PDU with an Extended Header.

It should be noted that according to the above, when the first device transmits an acknowledgement packet to the second device, the packet header of the acknowledgement packet is also generated based on the BLE CIS PDU. Therefore, it can be considered that all data packets transmitted on the EBA link are EBA PDUs.

The specific method of generating the data packets transmitted by the second device based on BLE CIS PDUs is not limited here. For example, based on the packet header of the BLE CIS PDU, the EBA PDU takes one reserved field (Reserved for Future Use, RFU) in the packet header of the BLE CIS PDU as the first region and the other RFU as the fourth region. In the specific implementation, since the data packets transmitted by the second device all carry data, the data packets transmitted by the second device can be considered as EBA Data PDU.

In one embodiment, the first device communicates with the second device wirelessly based on the EBA link, and the data packets transmitted by the second device are generated based on BLE CIS PDUs. With the above settings, the EBA link can be considered as the CIS link that enables the EBA function.

In one embodiment, after 301, the method further comprises: determining the data packets in the second data group based on the target mapping table and a maximum number of data packets that can be transmitted during a current time interval when the second device successfully receives the target mapping table; determining the second data group based on the maximum number of data packets that can be transmitted during the current time interval when the second device does not successfully receive the target mapping table.

In one embodiment, the determining the second data group based on the maximum number of data packets that can be transmitted during the current time interval, comprises: determining the data packets in the second initial data group, wherein the number of data packets in the second initial data group is less than or equal to the maximum number of data packets that can be transmitted during the current time interval; selecting a portion of the data packets transmitted by the second device before the second time interval but not successfully received by the first device as the data packets in the second retransmission data group when the number of data packets in the second initial data group is less than the maximum number of data packets that can be transmitted in the current time interval. When the second device successfully receives the target mapping table, it can confirm which data packets are to be transmitted as the data packets within the second data group based on the target mapping table; the number of data packets within the second data group can be determined based on the maximum number of data packets that can be transmitted within the current time interval.

In the event that the second device does not successfully receive the target mapping table, the second device cannot confirm which of the data packets it transmitted during the first time interval were successfully received by the first device and which data packets were not successfully received by the first device. Therefore, in general, when the second device does not successfully receive the target mapping table, it is assumed that all the data packets transmitted in the previous time interval are not successfully received by the first device. When the second device does not successfully receive the target mapping table, the data packets of the second initial data group are first determined. In one case, the number of data packets in the determined second first data packet group is equal to the maximum number of data packets that can be transmitted in the current time interval, and no more data packets can be transmitted in the current time interval, so only data packets in the second initial data packet group are transmitted in the current time interval.

In another case, the number of data packets in the determined second initial data group is less than the maximum number of data packets that can be transmitted in the current time interval, and other data packets other than the second initial data group can be transmitted in the current time interval, i.e., data packets in the second retransmission data group. Thus, the second device selects some data packets from the data packets transmitted before the second time interval but not successfully received by the first device as the data packets in the second retransmission data group, and the total number of data packets in the second retransmission data group and the data packets in the second initial data group is less than the maximum number of data packets that can be transmitted in the current time interval.

In the embodiment of the present invention, in the case that the second device cannot confirm which of the data packets it transmits in the first time interval are successfully received by the first device and which data packets are not successfully received by the first device, the second device gives priority to ensure that the second initial data group is sent. Since there is a higher probability that the data packets transmitted by the second device can be successfully received by the first device, the efficiency of data transmission can be improved by the above method.

In one embodiment, before the operation 301, the method further comprises: transmitting a first data group to the first device during a first time interval. The first data group comprises a first initial data group and/or a first retransmission data group, wherein the first initial data group comprises one or more first data packets that have not been transmitted by the second device before the first time interval, and the first retransmission data group comprises one or more second data packets comprising at least a portion of one or more data packets transmitted by the second device before the first time interval that were not successfully received by the first device.

The second device transmits the first data group to the first device during the first time interval. The first device receives the first data group transmitted by the second device at the first time interval.

In one embodiment, the second device transmits the second initial data group to the first device during the second time interval. In other embodiment, the second device transmits the second retransmission data group to the first device during the second time interval. In a further embodiment, the second device transmits the second initial data group and the second retransmission data group to the first device within the second time interval.

In this embodiment, the description of the second initial data group may refer to the description of the first initial data group, and the description of the second retransmission data group may refer to the description of the first retransmission data group, which will not be repeated herein to avoid repetition.

In one embodiment, the operation 302 specifically comprises: transmitting all data packets in the second data group to the first device during a first time period in the second time interval; performing a second pre-retransmission operation comprising retransmitting at least some of the data packets of the second data group to the first device during a second time period in the second time interval. The first time period is located before the second time period.

In one embodiment, the second device first transmits all third data packets within the second initial data group and all fourth data packets in the second retransmission data group to the first device within the first time period. The second device performs the second pre-retransmission operation to transmit at least some of the third data packets and/or at least some of the fourth data packets that have already been transmitted once during the first time period to the first device again during the second time period.

It is noted that the number of data packets retransmitted when the second device performs the second pre-retransmission operation is not limited here. In a specific implementation, the number of data packets retransmitted when the second device performs the second pre-retransmission operation is determined based on the length of the second time period and the size of the data packets.

In one embodiment, the second device performs the second pre-retransmission operation by retransmitting at least some of the third packets to the first device, and then retransmitting at least some of the fourth packets based on the length of the remaining second time period after the second device has retransmitted all of the third data packets.

In other embodiment, the second device performs the second pre-retransmission operation by retransmitting at least some of the fourth packets to the first device, and then retransmitting at least some of the third packets based on the length of the remaining second time period after the second device has retransmitted all of the fourth packets.

In other embodiment, the second device performs the second pre-retransmission operation by retransmitting a portion of the third packets selected or randomly selected according to a predetermined rule to the first device, and retransmitting a portion of the fourth packets selected or randomly selected according to the predetermined rule to the first device.

In other embodiment, depending on the length of the second time period, the number of times that the second device performs the second pre-retransmission operation may be increased. For example, after the second device retransmits at least a portion of the third packets and/or at least a portion of the fourth packets to the first device within the second time period, and there is still a redundant time slot within the second time interval, the second device may perform the second pre-retransmission operation once more. That is, the second device may retransmit at least a portion of the third packets and/or at least a portion of the fourth packets to the first device within the redundant time slot.

In the embodiment of the present invention, the second device performs the second pre-retransmission operation after transmitting all the data packets in the second initial data group and the second retransmission data group to the first device to retransmit at least some of the third packets and/or at least some of the fourth packets. By the above settings, a utilization of the time slot is improved and the probability that the retransmitted data packets are successfully received by the first device is increased, thus improving the reliability of data transmission.

In one embodiment, each the data packet in the second data group is provided with a first sequence number. The first sequence number is determined based on the chronological order in which the data packets were first sent. The second pre-retransmission operation comprises: transmitting the first X data packets in the second data group in an ascending order of the first sequence number during the second time period, X being a positive integer and being determined based on the maximum number of data packets that can be transmitted during the current time interval, and the number of data packets transmitted during the first time period.

After the second device transmits all packets in the second initial data group and the second retransmission data group to the first device for the first time in the first time period of the second time interval, the first X packets in the second data group are transmitted sequentially in the second time period in the order of the first sequence number from smallest to largest.

It is to be noted that the first X data packets in the second data group comprise the third data packet and/or the fourth data packet. In a specific implementation, the number of third packets and the number of fourth packets comprised in the second data group can both be any number depending on the first sequence numbers of the third data packets and the fourth data packets.

In one embodiment, a maximum value of X is the difference between the maximum number of data packets that can be transmitted in the current time interval and the number of data packets transmitted in the first time period.

In one embodiment, the data packets retransmitted by the second device in the second time period are determined based on the first sequence number of the data packets. The value range of X can be determined based on the maximum number of data packets that can be transmitted in the current time interval and the number of data packets transmitted in the first time period. In the specific implementation, a specific value of X in the value range can be set and adjusted according to the actual needs.

In one embodiment, the second device determines the data packets retransmitted in the second time period based on the first sequence number corresponding to the data packets. By the above setting, the probability of data packets with smaller first sequence numbers being received by the first device can be increased. In this way, in the case where the target mapping table comprises the second region and the third region, the size of the target sequence number can be reduced, thereby increasing the maximum first sequence number that can be represented by the target mapping table, so that the target mapping table can be used to represent the reception status of more data packets.

Of course, the second device may determine the data packets to be retransmitted during the second time period based on other policies. For example, in one embodiment, the second pre-retransmission operation comprises retransmitting X data packets in the second time period in the ascending order of the first sequence number, wherein the X data packets comprise P third data packets and/or Y fourth data packets, wherein P, Y are both natural numbers.

In one embodiment, before the operation 302, the method further comprises: obtaining N third data packets from a transmitting cache to obtain the second initial data group, and obtaining M fourth data packets from the transmitting cache to obtain the second retransmission data group; wherein N and M are natural numbers and WEN K, and K is the maximum number of data packets that can be transmitted by the second device during the current time interval.

In a specific implementation, the second device may store the data to be transmitted in the transmitting cache. Specifically, the second device may divide the data to be transmitted into a plurality of Service Data Units (SDUs) and store them in the transmitting cache. The number of SDUs entered in each time interval is the number of corresponding encapsulated EBA Data PDUs. In the specific implementation, the second device can divide the data to be transmitted into multiple SDUs of the same size.

In one embodiment, the second device obtains N SDUs from the transmitting cache and encapsulates them into EBA Data PDUs correspondingly, and the N EBA Data PDUs form the second initial data group. The N SDUs obtained are those that have not been encapsulated into EBA Data PDUs before the current time interval and transmitted to the first device.

In one embodiment, the second device obtains M SDUs from the transmitting cache and encapsulates them as EBA Data PDUs, and the M EBA Data PDUs form the second retransmission data group. The M SDUs obtained are those encapsulated as the EBA Data PDUs transmitted to the first device before the current time interval and not successfully received by the first device.

After the SDUs are encapsulated as the EBA Data PDUs and transmitted to the first device and successfully received by the first device, the corresponding SDUs can be deleted in the transmitting cache to avoid duplicating the data that has been successfully received by the first device.

It should be understood that K is the maximum number of data packets that can be transmitted during the second time interval. In one embodiment, K is determined based on the length of the second time interval, the size of the target mapping table, the Time of Minimum Slot Space (T_MSS), and the size of the data packet. In other embodiments, K is determined based on the length of the second time interval, T_MSS, and the size of the data packet.

The size of the target mapping table may be the length of an airtime needed for the first device to transmit the target mapping table to the second device. The size of the data packet may be the length of the airtime needed by the second device to transmit the data packet to the first device, wherein the length of the airtime needed by the second device to transmit the data packet to the first device is determined based on the length of the airtime that each data packet needs to occupy to be transmitted and the T_MSS. The length of the second time interval may be a predetermined fixed time length or may be a variable time length.

It is noted that in the case of using the PRT technique, the maximum number of data packets that can be transmitted during the second time interval is the sum of the number of data packets transmitted for the first time and the number of pre-retransmitted data packets.

Within one time interval, a time slot for the second device to transmit data packets to the first device, a time slot for the second device to perform the second pre-retransmission operation, a time slot for the first device to transmit the target mapping table to the second device, a time slot for the first device to perform the first pre-retransmission operation, and other time slots are comprised. The specifics of other time slots are not limited here. For example, the other time slots may be the time slots for BLE Asynchronous Connection-Oriented (ACL) link, specifically, the transmit (TX) and receive (RX) time slots for BLE ACL link, which may be used to assist in establishing EBA links and negotiate EBA link parameters.

Within one time interval, a starting point of the time interval may be a starting point of transmitting the first data packet within the first data group within that time interval. The interval between the starting point of the time interval and the starting point of transmitting the target mapping table (acknowledgement packet) within that time interval is a predetermined fixed interval, i.e., EBA Delay. Regardless of how many data packets are transmitted by the second device, the first device transmits the target mapping table at a preset determined time point at the end of the EBA Delay to facilitate the correct reception of the target mapping table by the second device.

In a specific implementation, the length of the EBA Delay is usually predetermined. With the length of this time interval known, the length of the EBA Delay can be determined after reserving the time for transmitting at least one acknowledgement packet and for other links.

Figure 4:
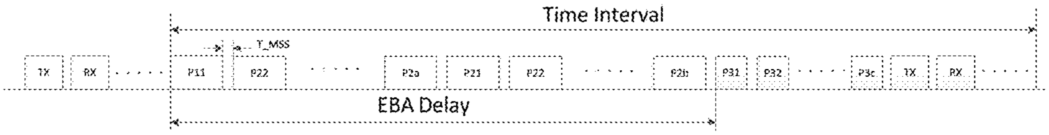
FIG. 4 is a schematic diagram of a time slot structure of an EBA link and a PRT provided according to one embodiment of the present invention.

For ease of understanding, a specific embodiment will be illustrated below as an example. As shown in FIG. 4. in the time slot structure as shown in FIG. 4, P11, P12, . . . , P1*a* can be understood as the EBA Data PDUs first transmitted by the second device to the first device within the first time period, P21, P22, . . . , P2*b* can be understood as the EBA Data PDUs retransmitted by the second device to the first device within the second time period, and P31, P32, P2*c* can be understood as the acknowledgement packets transmitted by the first device to the second device.

In this embodiment, assuming that the length of one time interval is 20 ms and the data packets within the second data group are transmitted at BLE 2 Mbps rate, a packet length of one data packet with a load size of 250 Byte is 1068 us. The T_MSS in the time slot structure as shown in FIG. 4 is equal to 200 us, so the airtime for transmitting one data packet is 1268 us in total. Assuming that the packet length of the acknowledgement packet carrying the target mapping table is 68 us, and adding the T_MSS, the airtime occupied by transmitting one acknowledgement packet is 268 us.

In the specific implementation, K is the maximum number of data packets that can be transmitted by the second device during the current time interval, and the total number of data packets transmitted by the second device during the current time interval is less than or equal to K. In the specific implementation, the total number of data packets transmitted by the second device during the current time interval can be set according to the actual needs.

In one embodiment, both the third data packet and the fourth data packet can be obtained from the transmitting cache, while the maximum value of the total number of the third data packet and the fourth data packet is determined based on the length of the second time interval, the size of the target mapping table, and the size of the data packet. Through the above settings, the convenience of data acquisition is improved, and the number of packets transmitted is more reasonable.

In one embodiment, the target mapping table comprises a plurality of bits, the reception status of one data packet occupying one of the bits. The number of occupied bits of the target mapping table is T1 and the number of unoccupied bits of the target mapping table is T2, T1 and T2 are natural numbers. $N \leq T2$, N is the number of the third data packets obtained from the transmitting cache to obtain the second initial data group.

It should be understood that the target mapping table comprises a plurality of bits, and each bit is used to represent the reception status of one data packet. In one embodiment, the total number of bits of the target mapping table can be considered to be the number of data packets that the target mapping table can be used to represent.

Since the target mapping table needs to represent the reception status of data packets received during the current time interval and the reception status of data packets received during one or more previous time intervals, the total number of bits of the target mapping table should be at least greater than the number of data packets transmitted during one time interval.

When all the bits of the target mapping table are occupied, the target mapping table can no longer represent the reception status of a new data packet transmitted for first time, but the reception status of one data packet that has occupied one bit can be modified. Therefore, the number of third data packets obtained by the second device from the transmitting cache should be less than the number of unoccupied bits in the target mapping table.

In one embodiment, the number of data packets transmitted for first time is smaller than the number of unoccupied bits in the target mapping table. With the above settings, it is ensured that the reception status of each transmitted data packet can be represented in the target mapping table.

Figure 5:
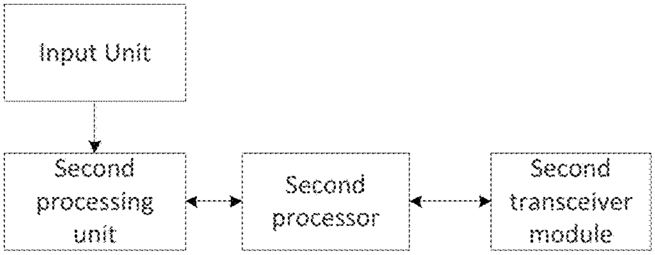
FIG. 5 is a block structure diagram of an exemplary second device according to one embodiment of the present invention.

FIG. 5 is a block structure diagram of a second device provided according to one embodiment of the present invention. As shown in FIG. 5, the second device provided comprises a second processing unit, an input unit, a second transceiver module, and a second processor.

In one embodiment, the input unit acquires external digital signals and transmits them to the second processing unit. The second processing unit losslessly compresses and encodes the digital signal into a data stream and divides it into SDUs of the same size. The second processor performs associated protocols to encapsulate the SDUs into data packets suitable for transmission by the second transceiver module and process the received target mapping table. The second transceiver module is used for transmitting and receiving wireless signal, including transmitting data packets and receiving data packets.

For ease of understanding, the following will take the transmitted data as audio data for example. In this embodiment, the input unit acquires and output external digital audio signals to the second processing unit. The second processing unit losslessly compresses and encodes the digital audio signal into an audio data stream and divides it into SDUs of the same size. The second processor executes the BLE protocol associated with BLE Audio and the EBA link protocol, to encapsulate the audio SDUs into EBA Data PDUs suitable for transmission by the second transceiver module and process the received EBA PDUs carrying the target mapping table. The second transceiver module is used for transmitting and receiving BLE radio signal, including transmitting EBA PDUs and receiving EBA PDUs.

Figure 6:
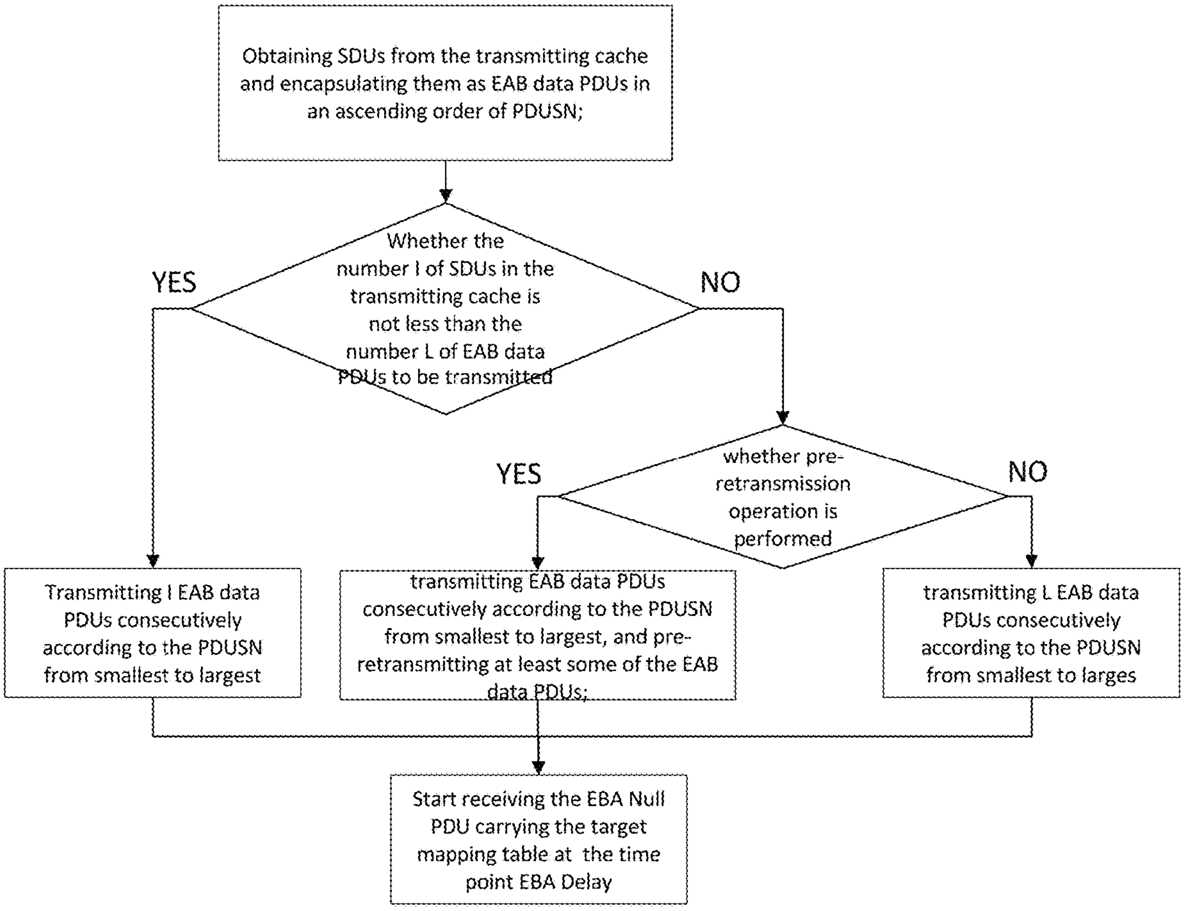
FIG. 6 is a flowchart illustrating a process of transmitting and receiving data packets by the second device provided according to one embodiment of the present invention.

For ease of understanding, the specific process of the data transmission method provided according to one embodiment of the present invention will be described below with two specific embodiments as examples. In the following first and second embodiments, a one-way transmission of audio data will be described as an example. Thus, in the first and second embodiments, the first device can be used as an audio receiving device and the second device can be used as an audio source device, wherein a flowchart of transmitting and receiving data packets by the second device is shown in FIG. 6. The data transmission method provided in first embodiment and second embodiment can be applied in a wireless audio transmission system as shown in FIG. 7.

Referring to FIG. 7, the wireless audio transmission system as shown is a one-way wireless lossless audio system using EBA link protocol and PRT technology. The second device uses an APTX lossless audio codec (APTX-Lossless) named by Audio Processing Technology (APT) company, with an encoding rate of 1 Mbps.

Referring to FIG. 8, in an extended packet header structure of the EBA PDU, both BTN and BTSN occupy 4 bits, PDUSN occupies 8 bits, STARTSN occupies 8 bits, and MT occupies 40 bits. In the first and second embodiments, the BTE of the EBA Data PDU transmitted by the second device to the first device is configured as 1, EBAE is configured as 0, NPI is set as 0, and its packet header is 4 Byte. The BTE of the EBA Null PDU carrying the target mapping table transmitted by the first device to the second device is configured as 0, EBAE is configured as 1, NPI is set as 1, and its packet header is 8 Byte.

The second device divides the audio stream data at 1 Mbps rate into audio SDUs of the same size, and each SDU contains 2 ms of stereo data, i.e. 250 Byte. It should be noted that the number I of SDUs in the transmitting cache at a certain time interval should be greater than the number L of SDUs ready to be input at that time interval. Otherwise, the number of input SDUs at that time interval is I.

Referring to FIG. 4, in the time slot structure, the length of one time interval is 20 ms, and the number of SDUs input by the second device at each time interval is recorded as L. In the first and second embodiments, L is set to 10, so the number of corresponding encapsulated EBA Data PDUs is also equal to 10. The second device stores the SDUs in the transmitting cache after numbering them sequentially. The number of bits of PDUSN is 8, i.e., the numbering is from 0 to 255, and then the numbering is cyclic from 0 after it is greater than 255. After the cyclic numbering, the PDUSN equal to 0 is considered to be greater than the PDUSN equal to 255 next to it.

In the first and second embodiments, EBA PDUs are transmitted at BLE 2 Mbps rate, and the occupied airtime of one EBA Data PDU with a payload size of 250 Byte is 1068 us. T_MSS in the time slot structure shown in FIG. 4 is equal to 200 us. From this, it can be seen that the airtime for transmitting one EBA Data PDU is 1268 us in total. In the first embodiment and the second embodiment, the maximum number of EBA Data PDUs that can be transmitted in a batch within one time interval is set to 14, and the total occupied airtime is 17.752 ms, and the corresponding EBA Delay is equal to 17.752 ms. The occupied airtime of the EBA Null PDU carrying the target mapping table is 68 us, the airtime of transmitting one EBA Null PDU is 268 us by adding the T_MSS. In the first and second embodiments, the maximum number of EBA Null PDUs transmitted in one time interval is set to 2, and the total occupied airtime is 536 us. Sending 14 EBA Data PDUs in batch and two EBA Null PDUs consecutively within a time interval takes 18.288 ms of air time. The remaining 1.712 ms in this time interval can be used for the BLE ACL link, specifically for the TX and RX timeslots of the BLE ACL link, and can be used to help establish the EBA link and negotiate EBA link parameters.

First Embodiment

In this embodiment, the second device does not perform the second pre-retransmission operation, i.e., the second device does not use the PRT technology.

The data interaction between the first device and the second device during the first time interval is as follows:

The number L of SDUs input by the second device in the first time interval is equal to 10, the number of encapsulated EBA Data PDUs is equal to 10, and the PDUSNs of the 10 encapsulated EBA Data PDUs in the current time interval are numbered 0, 1, 2, . . . , 9 in order. The number of EBA Data PDUs transmitted in the current time interval is equal to 10. The BTN in the packet header of each EBA Data PDU is set to 10, and the BTSN in the packet header of 10 EBA Data PDUs is set to 0, 1, 2, . . . , 9 in order. The second device transmits 10 EBA Data PDUs in order, and the first device receives 10 EBA Data PDUs in order. At this time, all the EBA Data PDUs transmitted in the first time interval can be considered as the data packets not transmitted by the second device before the current time interval.

At the time point EBA Delay is equal to 17.752 ms, the first device transmits two consecutive EBA Null PDUs carrying the target mapping table, and they are successfully received by the second device. Assuming that the second device receives all 10 EBA Data PDUs successfully, then the STARTSN in the packet header of the EBA Null PDU can be set to 10. The value of all bits of MT is 1. It means that the EBA Data PDUs with PDUSN of 0 to 9 do not need to be retransmitted. It should be noted that in this case, because the STARTSN is 10, no bits of MT is occupied, and the value of all unoccupied bits of the MT can be set to 1.

After the second device successfully receives the EBA Null PDU carrying the target mapping table transmitted by the first device, it deletes the SDUs with PDUSN equal to 0, 1, 2, and 9 in the transmitting cache.

The data interaction between the first device and the second device during the second time interval is as follows:

The number L of SDUs input by the second device in the second time interval is equal to 10, the number of encapsulated EBA Data PDUs is equal to 10, and the PDUSNs of the 10 encapsulated EBA Data PDUs in this time interval are numbered 10, 11, 12, . . . , 19 in order. In the current time interval, the number of EBA Data PDUs transmitted in the current time interval is equal to 10. Since there is no received failed data packet before the second time interval, the 10 EBA Data PDUs transmitted in the second time interval are not the data packets that have not been transmitted by the second device before the current time interval. The BTN in the packet header of each EBA Data PDU is set to 10, and the BTSN in the packet header of the 10 EBA Data PDUs is set to 0, 1, 2, . . . , 9 in order. The second device transmits the 10 EBA Data PDUs in order, and the first device receives the 10 EBA Data PDUs in order.

At the time point EBA Delay is equal to 17.752 ms, the first device transmits two consecutive EBA Null PDUs carrying the target mapping table, and they are successfully received by the second device. Due to interference, the second device successfully receives 8 EBA Data PDUs, and the two EBA Data PDUs with PDUSN equal to 13 and 15 are not successfully received. In this case, the minimum value of PDUSN corresponding to the received failed data packet is 13, then the STARTSN in the packet header of the EBA Null PDU can be set to 13, and the value of the 0th and 2nd bits in MT is set to 1, which represents the two EBA Data PDUs with PDUSN of 13 and 15 need to be retransmitted. The 1st, 3rd, 4th, 5th and 6th bits in the MT are set to representing the EBA Data PDUs with PDUSNs 10, 11, 12, 14, 16, 17, 18 and 19 do not need to be retransmitted. It should be noted that in this case, the value of all other unoccupied bits of the MT can be set to 1.

After the second device successfully receives the EBA Null PDU carrying the target mapping table transmitted by the first device, it deletes the SDUs with PDUSN equal to 10, 11, 12, 14, 16, 17, 18 and 19 in the transmitting cache and retains the two SDUs with PDUSN equal to 13 and 15 to retransmit at subsequent time intervals.

The data interaction between the first device and the second device during the third time interval is as follows:

The number L of SDUs input by the second device in the third time interval is equal to 10, the number of encapsulated EBA Data PDUs is equal to 10, and the PDUSNs of the 10 encapsulated EBA Data PDUs in this time interval are numbered 20, 21, 22, . . . , 29 in order. Meanwhile, the second device retransmits the 2 EBA Data PDUs transmitted in the second time interval that were not correctly received by the first device, so the number of EBA Data PDUs transmitted in the current time interval is equal to 12, wherein 10 EBA Data PDUs are packets that have not been transmitted before the current time interval, and 2 EBA Data PDUs are retransmitted in the current time interval. The BTN in the packet header of each EBA Data PDU is set to 12, and the BTSNs in the packet header of the 12 EBA Data PDUs are set to 0, 1, 2, . . . , 9, 10, 11 in order. The BTSNs corresponding to the two EBA Data PDUs with PDUSN 13 and 15 are 0 and 1, respectively, and the BTSNs corresponding to the EBA Data PDUs with PDUSNs 20, 21, 22, . . . and 29 are 2 to 11 in order. The second device transmits the 12 EBA Data PDUs in order, and the first device receives the 12 EBA Data PDUs in order.

At the time point EBA Delay is equal to 17.752 ms, the first device transmits two consecutive EBA Null PDUs carrying the target mapping table, but due to interference, the EBA Null PDUs transmitted twice were not successfully received by the second device. Meanwhile, due to interference, the first device successfully receives 7 EBA Data PDUs, while the 5 EBA Data PDUs with PDUSN equal to 15, 20, 22, 23 and 25 are not successfully received. In this case, the minimum value of PDUSN corresponding to the received failed data packet is 15, then the STARTSN in the packet header of the EBA Null PDU can be set to 15, and the values of the 0th, 5th, 7th, 8th and 10th bits of MT are set to 1, representing the 5 EBA Data PDUs with PDUSN equal to 15, 20, 22, 23 and 25 need to be retransmitted. The 1st, 2nd, 3rd, 4th, 6th, 9th, 11th, 12th, 13th, and 14th bits are set to 0, representing the EBA Data PDUs with PDUSNs of 16, 17, 18, 19, 21, 24, 26, 27, 28, and 29 do not need to be retransmitted. Similarly, the value of all other unoccupied bits in MT is set to 1.

However, the EBA Data PDUs with PDUSN of 13, 15, 20, 21, 22, . . . , 29 remain in the transmitting cache during this time interval because the second device does not successfully receive the EBA Null PDU carrying the target mapping table transmitted by the first device.

The data interaction between the first device and the second device during the fourth time interval is as follows:

The number L of SDUs input by the second device in the fourth time interval is equal to 10, the number of encapsulated EBA Data PDUs is equal to 10, and the PDUSNs of the 10 encapsulated EBA Data PDUs in this time interval are numbered 30, 31, 32, . . . , 39 in order. Since the second device does not successfully receive the EBA Null PDU carrying the target mapping table, so the second device cannot confirm which EBA Data PDUs need to be retransmitted. In this implementation, the second device transmits 10 SDUs that have not been transmitted before the current time interval in priority, and takes 4 SDUs from the transmitting cache in the ascending order of PDUSN and transmits them together. In other words, the number M of EBA Data PDUs transmitted in the current time interval is equal to 14, that is, the EBA Data PDUs with PDUSNs of 13, 15, 20, 21, 30, 31, 32, . . . , 39 are transmitted in order. The BTN in the packet header of each EBA Data PDU is set to 14, and the BTSN in the packet header of each EBA Data PDU is set to 0, 1, 2, . . . , 11, 12, 13 respectively. The second device transmits the 14 EBA Data PDUs in order, and the first device receives the 14 EBA Data PDUs in order.

At the time point EBA Delay equals to 17.752 ms, the first device transmits two consecutive EBA Null PDUs carrying the target mapping table and is successfully received by the second device. As the interference disappears, the second device successfully receives all 14 EBA Data PDUs. However, the three EBA Data PDUs with PDUSN equal to 22, 23 and 25 still need to be retransmitted. In this case, it can be determined that the EBA Data PDUs with PDUSN equal to 13, 15 and 20 are no longer received failed data packets, and the minimum value of PDUSN corresponding to the received failed data packet is 22 at this time. The STARTSN in the packet header of the EBA Null PDU can be set to 22, and the values of the 0th, 1st and 3rd bits of MT are set to 1, which mean that the 3 EBA Data PDUs with PDUSN of 22, 23, 25 also need to be retransmitted. The 2nd, 4th, 5th, . . . , and 17th bits are set to 0, which mean that the EBA Data PDUs with PDUSN of 24, 26, 27, . . . , and 39 do not need to be retransmitted, and similarly, the values of the other unoccupied bits in MT are set to 1.

After the target mapping table transmitted by the first device, deletes the EBA Data PDUs with PDUSN equal to 13, 15, 20, 21, 24, 26, 27, . . . , 39 in the transmitting cache, and reserves the 3 EBA Data PDUs with PDUSN of 22, 23, 25 for retransmission at subsequent time intervals.

The data interaction between the first device and the second device during the fifth time interval is as follows:

The number L of SDUs input by the second device in the fifth time interval is equal to 10, the number of encapsulated EBA Data PDUs is equal to 10, and the PDUSNs of the 10 encapsulated EBA Data PDUs in this time interval are numbered 40, 41, 42, . . . , 49 in order. In the current time interval, the number of EBA Data PDUs transmitted in the current time interval is equal to 13, wherein 10 EBA Data PDUs are data packets that have not been transmitted before the current time interval, and 3 EBA Data PDUs are received failed data packets needed to be retransmitted in the current time interval. The BTN in the packet header of each EBA Data PDU is set to 13, and the BTSN in the packet header of the 13 EBA Data PDUs is set to 0, 1, 2, . . . , 10, 11, 12 in order. The BTSNs of the three EBA Data PDUs with PDUSNs 22, 23 and 25 are 0, 1 and 2 respectively, and the BTSNs of the EBA Data PDUs with PDUSNs 40, 41, 42, . . . and 49 are 3 to 12 in order. The second device transmits 13 EBA Data PDUs in order, and the first device receives 13 EBA Data PDUs in order.

At the time point EBA Delay equals to 17.752 ms, the first device transmits two consecutive EBA Null PDUs carrying the target mapping table, and they are successfully received by the second device. Because the second device received all 13 EBA Data PDUs successfully, the STARTSN in the packet header of the EBA Null PDU can be set to 50 and the value of all bits of MT can be set to 1, which represent that all EBA Data PDUs with PDUSN not greater than 49 do not need to be retransmitted.

After the target mapping table transmitted by the first device, deletes the SDUs with PDUSN equal to 22, 23, 25, 40, 41, 42, and 49 in the transmitting cache.

Second Embodiment

The second device performs the second pre-retransmission operation in this embodiment, i.e., the second device uses the PRT technology.

The data interaction between the first device and the second device during the first time interval is as follows:

The number L of SDUs input by the second device in the first time interval is equal to 10, the number of encapsulated EBA Data PDUs is equal to 10, and the PDUSNs of the 10 encapsulated EBA Data PDUs in the current time interval are numbered 0, 1, 2, . . . , 9 in order. The number of EBA Data PDUs transmitted in the current time interval is equal to 14. Wherein, 10 EBA Data PDUs are data packets that have not been transmitted before the current time interval, and 4 EBA Data PDUs are 4 data packets of the 10 EBA Data PDUs pre-retransmitted by the second device using PRT technology. The BTN in the packet header of each EBA Data PDU is set to 14, and the BTSN in the packet header of 14 EBA Data PDUs is set to 0, 1, 2, . . . , 11, 12, 13 in order, the PDUSNs of 14 EBA Data PDUs are 0, 1, 2, . . . , 9, 0, 1, 2, 3. The second device transmits 14 EBA Data PDUs in order, and the first device receives 14 EBA Data PDUs in order.

At the time point EBA Delay equals to 17.752 ms, the first device transmits two consecutive EBA Null PDUs carrying the target mapping table and is successfully received by the second device. Due to interference, the EBA Data PDUs with BTSN equal to 1 and 3 are not successfully received by the first device, and the EBA Data PDUs with the other BTSNs are successfully received. Since the EBA Data PDUs with BTSN equal to 1 and 3 correspond to the same PDUSN as the EBA Data PDUs with BTSN equal to 11 and 13, respectively, the load carried by the EBA Data PDUs with BTSN equal to 1 and 3 is the same as the load carried by the EBA Data PDUs with BTSN equal to 11 and 13. Therefore, although there is interference leading to failed reception, all 10 SDUs input by the second device at the current time interval are successfully received by the first device due to the PRT technique. Therefore, the STARTSN in the packet header of the EBA Null PDU is set to 10, and the value of all bits of MT is 1, which means that none of the SDUs with PDUSN of 0 to 9 need to be retransmitted.

After the second device successfully receives the EBA Null PDU carrying the target mapping table transmitted by the first device, the SDUs with PDUSN equal to 1, 2, . . . and 9 in the transmitting cache are deleted.

The data interaction between the first device and the second device during the second time interval is as follows:

The number L of SDUs input by the second device in the second time interval is equal to 10, the number of encapsulated EBA Data PDUs is equal to 10, and the PDUSNs of the 10 encapsulated EBA Data PDUs in this time interval are numbered 11, 12, . . . , 19 in order. The number M of EBA Data PDUs transmitted in the current time interval is equal to 14, wherein 10 EBA Data PDUs are data packets that have not been transmitted before the current time interval, and 4 EBA Data PDUs are 4 data packets of the 10 EBA Data PDUs pre-retransmitted by the second device using PRT technology. The BTN in the packet header of each EBA Data PDU is set to 14, and the BTSN in the packet header of 14 EBA Data PDUs is set to 0, 1, 2, . . . , 11, 12, 13 in order, the PDUSNs of the 14 EBA Data PDUs is set to 10, 11, 12, . . . , 19, 10, 11, 12, 13 in order. The second device transmits 14 EBA Data PDUs in order, and the first device receives 14 EBA Data PDUs in order.

At the time point EBA Delay equals to 17.752 ms, the first device transmits two consecutive EBA Null PDUs carrying the target mapping table and is successfully received by the second device. Due to interference, the EBA Data PDUs with BTSN equal to 2 and 9 are not successfully received, and the EBA Data PDUs with other BTSNs are successfully received. Since the EBA Data PDU with BTSN equal to 2 corresponds to the same PDUSN as the EBA Data PDU with BTSN equal to 12, the load carried by the EBA Data PDU with BTSN equal to 2 is the same as the load carried by the EBA Data PDU with BTSN equal to 12. Therefore, although there is interference leading to failed reception, due to the PRT technique, only the EBA Data PDU with PDUSN of 19 is received incorrectly among 10 SDUs input in the current time interval and transmitted by the second device, and the other 9 SDUs are all successfully received. In this case, the minimum value of PDUSN corresponding to the received failed data packet is 19. In order to make the MT available to represent the reception status of more EBA Data PDUs, the STARTSN in the packet header of the EBA Null PDU is set to 19, and the value of all bits of MT is 1, which represent that none of the EBA Data PDUs with PDUSN of 10 to 18 need to be retransmitted, and only the EBA Data PDU with PDUSN of 19 needs to be retransmitted.

After the second device successfully receives the EBA Null PDU carrying the target mapping table transmitted by the first device, it deletes the SDUs with PDUSN equal to 10, 11, 12, . . . and 18 in the transmitting cache and reserves the SDUs with PDUSN equal to 19 to be retransmitted at a later time interval.

The data interaction between the first device and the second device during the third time interval is as follows:

The number of SDUs input by the second device in the third time interval is equal to 10, the number of encapsulated EBA Data PDUs is equal to 10, and the PDUSNs of the 10 encapsulated EBA Data PDUs in this time interval are numbered 20, 21, 22, . . . , 29 in order. The number M of EBA Data PDUs transmitted in the current time interval is equal to 14, wherein 10 EBA Data PDUs are data packets that have not been transmitted before this time interval and 4 EBA Data PDUs are 4 data packets of the 10 EBA Data PDUs pre-retransmitted by the second device using PRT technology. The BTN in the packet header of each EBA Data PDU is set to 14, and the BTSN in the packet header of the 14 EBA Data PDUs is set to 0, 1, 2, . . . , 11, 12, 13 in order, the PDUSNs of the 14 EBA Data PDUs is 19, 20, 21, 22 . . . , 29, 19, 20, 21. The second device transmits 14 EBA Data PDUs in order, and the first device receives 14 EBA Data PDUs in order.

At the time point EBA Delay is equal to 17.752 ms, the first device transmits EBA Null PDU carrying the target mapping table and is successfully received by the second device. Due to interference, the EBA Data PDUs with BTSN equal to 0 and 2 are not successfully received, the EBA Data PDUs with the other BTSNs are successfully received. Since the EBA Data PDUs with BTSN equal to 0 and 2 correspond to the same PDUSN as the EBA Data PDUs with BTSN equal to 11 and 13, the EBA Data PDUs with BTSN equal to 0 and 2 carry the same load as the EBA Data PDUs with BTSN equal to 11 and 13. Therefore, although there is interference leading to failed reception, all 10 SDUs input in the current time interval and one retransmitted SDU transmitted by the second device are successfully received due to the PRT technique. The STARTSN in the packet header of the EBA Null PDU is set to 30, and the value of all bits of MT is 1, which means that the SDUs with PDUSN of 19-29 do not need to be retransmitted.

After the second device successfully receives the EBA Null PDU carrying the target mapping table transmitted by the first device, the SDUs with PDUSN equal to 19-29 in the transmitting cache are deleted.

A data transmission device is provided according to one embodiment of the present invention. The data transmission device is the first device. FIG. 9 is a first structural diagram of the data transmission device provided according to one embodiment of the present invention. Since the principle of the data transmission device in FIG. 9 to solve the problem is similar to the data transmission method in the embodiment shown in FIG. 1, the implementation of the data transmission device can be referred to the implementation of the data transmission method, and the repetition will not be repeated.

As shown in FIG. 9, a data transmission device 900 is provided according to one embodiment of the present invention. The data transmission device 900 is used as the first device and comprises a first receiving module 901, a generation module 902 and a first transmitting module 903.

The first receiving module 901 is configured for receiving a first data group transmitted by a second device during a first time interval. The first data group comprises a first initial data group and/or a first retransmission data group, wherein the first initial data group comprises one or more first data packets that have not been transmitted by the second device before the first time interval, and the first retransmission data group comprises one or more second data packets comprising at least a portion of one or more data packets transmitted by the second device before the first time interval that were not successfully received by the first device.

The generation module 902 is configured for generating a target mapping table based on the reception status of the first data group and the reception status of data packets transmitted by the second device before the first time interval, the reception status comprising a failed reception.

The first transmitting module 903 is configured for transmitting the target mapping table to the second device within the first time interval.

In one embodiment, the reception status further comprises a successful reception. The first transmitting module 903 comprises a first transmitting unit for an acknowledgement packet to the second device within the first time interval, wherein a packet header of the acknowledgement packet comprises the target mapping table.

In one embodiment, each data packet transmitted by the second device to the first device is provided with a first sequence number being determined based on a chronological order in which the data packet was first transmitted by the second device. The packet header of the acknowledgement packet comprises a first region configured to represent whether the first device confirms the reception status of the data packets to the second device by an extended block acknowledgement within a current time interval. When the first device confirms the reception status of the data packet to the second device by the extended block acknowledgement within the current time interval, the packet header of the acknowledgement packet further comprises: a second region configured to represent a target sequence number; a third region configured to represent the reception status of the data packets in an ascending order of the first sequence number from the target sequence number. The target sequence number is a minimum value of the first sequence numbers corresponding to the data packets whose reception status is the failed reception.

In one embodiment, the first device communicates wirelessly with the second device based on an extended block acknowledgement link. The acknowledgement packet is generated based on a Bluetooth low energy BLE connected isochronous stream CIS protocol data unit PDU, and the packet header of the acknowledgement packet comprises: a logical link identifier configured for identify a load type of this data packet; a close isochronous event identifier configured for identify whether the isochronous event is closed; a Null PDU indicator configured for identify whether this data packet carries data; and a load length identifier configured to identify a load length of this data packet.

In one embodiment, the data transmission device 900 further comprises an actuation module for performing a first pre-retransmission operation. The first pre-retransmission operation comprises retransmitting the target mapping table at least once to the second device.

In one embodiment, the first receiving module 901 comprises: a first receiving unit for receiving all data packets in the first data group transmitted by the second device during a first time period in the first time interval, a second receiving unit for receiving one or more data packets retransmitted by the second device during a second time period in the first time interval, wherein the retransmitted data packets is at least some of the data packets in the first data group, and a first determination unit for determining the reception status of the first data group based on the data packets received during the first time period and the data packets received during the second time period. Wherein the first time period precedes the second time period.

The data transmission device 900 provided according to one embodiment of the present invention can perform the data transmission method as shown in FIG. 1, with similar principles and technical effects, which are not repeated herein.

A data transmission device being used as a second device is provided according to one embodiment of the invention. FIG. 10 is a second structure diagram of the data transmission device provided according to one embodiment of the present invention. Since the principle of the data transmission device to solve the problem is similar to the data transmission method in the embodiment shown in FIG. 3, the implementation of this data transmission device can be referred to the implementation of the data transmission method, and the repetition will not be repeated.

As shown in FIG. 10, a data transmission device 1000 provided according to one embodiment of the present invention is used as the second device. The data transmission device 1000 comprises a second receiving module 1001 and a second transmitting module 1002.

The second receiving module 1001 is configured for receiving a target mapping table from a first device. The target mapping table is generated based on a reception status of a first data group and a reception status of one or more data packets transmitted by the second device before a first time interval, the reception status comprises a failed reception.

The second transmitting module 1002 is configured for transmitting a second data group to the first device during a second time interval being after the first time interval. The second data group comprises a second initial data group and/or a second retransmission data group. The second initial data group comprises one or more third data packets that have not been transmitted by the second device before the second time interval, the second retransmission data group comprises one or more fourth data packets comprising at least some of the data packets transmitted by the second device which were not successfully received by the first device before the second time interval and/or at least some of the data packets of the first data group which were not successfully received by the first device.

In one embodiment, a packet header of each data packet transmitted by the second device comprises a fourth region configured to represent whether the second device is transmitting one or more data packets to the first device in the block transmission during a current time interval. When the second device transmits the data packets in the block transmission to the first device at the current time interval, each data packet transmitted by the second device at the current time interval further comprises at least one of: a fifth region, a six region and a seventh region.

The fifth region is configured for representing a total number of data packets transmitted by the second device during the current time interval. The sixth region is configured for representing a first sequence number of this data packet, the first sequence number is determined based on a chronological order in which this data packet was first transmitted by the second device. The seventh region is configured to represent a second sequence number of this data packet, the second sequence number is determined based on a chronological order in which this data packet was transmitted during the current time interval.

In one embodiment, the second device communicates wirelessly with the first device based on an extended block acknowledgement link. The data packet transmitted by the second device is generated based on BLE CIS PDU, and the packet header of the data packet further comprises: a logical link identifier configured for identify a load type of this data packet; a close isochronous event identifier configured for identify whether the isochronous event is closed; a Null PDU indicator configured for identify whether this data packet carries data; and a load length identifier configured to identify a load length of this data packet.

In one embodiment, the data transmission device 1000 further comprises a first determination module for determining the data packets in the second data group based on the target mapping table and a maximum number of data packets that can be transmitted during a current time interval when the second device successfully receives the target mapping table; a second determination module for determining the second data group based on the maximum number of data packets that can be transmitted during the current time interval when the second device does not successfully receive the target mapping table.

In one embodiment, the first determination module comprises: a second determination unit for determining the data packets in the second initial data group, wherein the number of data packets in the second initial data group is less than or equal to the maximum number of data packets that can be transmitted during the current time interval; a selection unit for selecting a portion of the data packets transmitted by the second device before the second time interval but not successfully received by the first device as the data packets in the second retransmission data group when the number of data packets in the second initial data group is less than the maximum number of data packets that can be transmitted in the current time interval.

In one embodiment, the data transmission device 1000 further comprises: a third transmitting module for transmitting a first data group to the first device during a first time interval. The first data group comprises a first initial data group and/or a first retransmission data group. The first initial data group comprises one or more first data packets that have not been transmitted by the second device before the first time interval, and the first retransmission data group comprises one or more second data packets comprising at least a portion of one or more data packets transmitted by the second device before the first time interval that were not successfully received by the first device.

In one embodiment, the second transmitting module 1002 comprises: a second transmitting unit for transmitting all data packets in the second data group to the first device during a first time period in the second time interval; an execution unit for performing a second pre-retransmission operation comprising retransmitting at least some of the data packets of the second data group to the first device during a second time period in the second time interval. The first time period is located before the second time period.

In one embodiment, each of the data packets in the second data group is provided with a first sequence number being determined based on a chronological order in which the data packets were first sent. The second pre-retransmission operation further comprises: transmitting the first X data packets in the second data group in an ascending order of the first sequence number during the second time period, X is a positive integer and is determined based on the maximum number of data packets that can be transmitted during the current time interval, and the number of data packets transmitted during the first time period.

In one embodiment, the data transmission device 1000 further comprises: an acquisition module for obtaining N third data packets from a transmitting cache to obtain the second initial data group, and obtaining M fourth data packets from the transmitting cache to obtain the second retransmission data group. N and M are natural numbers and $M+N \leqslant K$, and K is the maximum number of data packets that can be transmitted by the second device during the current time interval.

In one embodiment, the target mapping table comprises a plurality of bits, the reception status of one data packet occupies one of the bits, wherein the number of occupied bits of the target mapping table is T1 and the number of unoccupied bits of the target mapping table is T2, T1 and T2 being natural numbers, and $N \leqslant T2$.

The data transmission device 1000 provided according to one embodiment of the present invention can perform the above data transmission method as shown in FIG. 3 with similar implementation principles and technical effects, which are not repeated herein in this embodiment.

Figure 11:
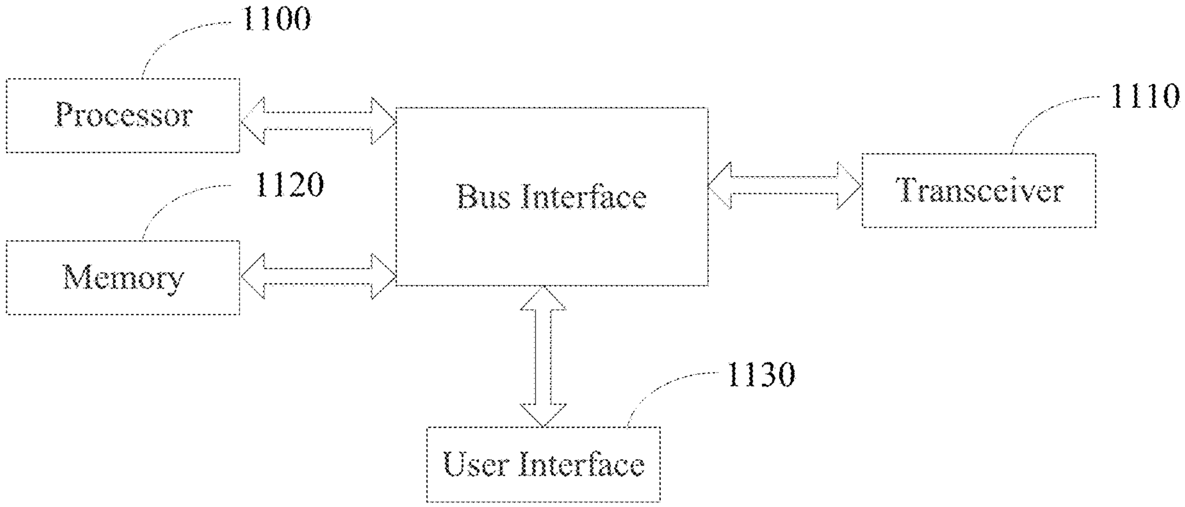
FIG. 11 is a structural diagram of an electronic device provided according to one embodiment of the present invention.

An electronic device is provided according to one of the present invention. Since the principle of the electronic device to solve the problem is similar to the data transmission method in the embodiment of the present invention, the implementation of the electronic device can be seen in the implementation of the method, and the repetition will not be repeated. As shown in FIG. 11, the electronic device provided according to one embodiment of the present invention, comprises: a processor 1100 configured for reading a program in the memory 1120 to perform following operations: receiving a first data group transmitted by a second device during a first time interval via a transceiver 1110; generating a target mapping table based on a reception status of the first data group and a reception status of the data packets transmitted by the second device before the first time interval, wherein the reception status comprises a failed reception; transmitting the target mapping table to the second device via the transceiver 1110 during the first time interval.

The first data group comprises a first initial data group and/or a first retransmission data group. The first initial data group comprises one or more first data packets that have not been transmitted by the second device before the first time interval, and the first retransmission data group comprises one or more second data packets comprising at least a portion of one or more data packets transmitted by the second device before the first time interval that were not successfully received by the first device.

Alternatively, the processor 1100 is configured for reading the program in the memory 1120 to perform following operations: receiving, via the transceiver 1110, a target mapping table from a first device, the target mapping table being generated based on a reception status of a first data group and a reception status of one or more data packets transmitted by the second device before a first time interval, the reception status comprising a failed reception; transmitting, via the transceiver 1110, a second data group to the first device during a second time interval being after the first time interval, the second data group comprising a second initial data group and/or a second retransmission data group, wherein the second initial data group comprises one or more third data packets that have not been transmitted by the second device before the second time interval, the second retransmission data group comprises one or more fourth data packets comprising at least some of the data packets transmitted by the second device which were not successfully received by the first device before the second time interval and/or at least some of the data packets of the first data group which were not successfully received by the first device. The transceiver 1110 is configured for receiving and transmitting data under the control of the processor 1100.

As shown in FIG. 11, the bus architecture may comprise any number of interconnected buses and bridges, one or more processors represented by processor 1100 and memories represented by memory 1120 are connected together via a bus. The bus architecture may also link together various other circuits such as peripherals, voltage regulators, and power management circuits, which are well known in the art and, therefore, will not be further described herein. A bus interface provides the interface. The transceiver 1110 may be a plurality of elements, i.e., including a transmitter and a receiver, providing units for communicating with various other devices over a transmission medium. For different user devices, the user interface 1130 may also be an interface capable of external internal connection of needed devices, devices connected to the user interface 1130 comprise, but are not limited to, keypads, displays, speakers, microphones, joysticks, etc.

The processor 1100 is responsible for managing the bus architecture and the usual processing, and the memory 1120 can store the data used by the processor 1100 in performing operations. In one embodiment, the processor 1100 is also used to execute the program in the memory 1120 to perform the following operations: transmitting an acknowledgement packet to the second device within the first time interval via the transceiver 1110 to the second device within the first time interval, wherein a packet header of the acknowledgement packet comprises the target mapping table.

In another embodiment, each data packet transmitted by the second device to the first device is provided with a first sequence number being determined based on a chronological order in which the data packet was first transmitted by the second device. The packet header of the acknowledgement packet comprises a first region configured to represent whether the first device confirms the reception status of the data packets to the second device by an extended block acknowledgement within a current time interval. When the first device confirms the reception status of the data packet to the second device by the extended block acknowledgement within the current time interval, the packet header of the acknowledgement packet further comprises: a second region configured to represent a target sequence number; a third region configured to represent the reception status of the data packets in an ascending order of the first sequence number from the target sequence number. The target sequence number is a minimum value of the first sequence numbers corresponding to the data packets whose reception status is the failed reception.

In one embodiment, the first device communicates wirelessly with the second device based on an extended block acknowledgement link. The acknowledgement packet is generated based on a Bluetooth low energy BLE connected isochronous stream CIS protocol data unit PDU, and the packet header of the acknowledgement packet comprises: a logical link identifier configured for identify a load type of this data packet; a close isochronous event identifier configured for identify whether the isochronous event is closed; a Null PDU indicator configured for identify whether this data packet carries data; and a load length identifier configured to identify a load length of this data packet.

In one embodiment, the processor 1100 is further used to execute the program in the memory 1120 to perform the following operations: performing a first pre-retransmission operation. The first pre-retransmission operation comprises retransmitting the target mapping table at least once to the second device.

In one embodiment, the processor 1100 is further used to execute the program in the memory 1120 to perform the following operations: receiving all data packets in the first data group transmitted by the second device during a first time period in the first time interval via the transceiver 1110; receiving one or more data packets retransmitted by the second device during a second time period in the first time interval via the transceiver 1110, wherein the retransmitted data packets is at least some of the data packets in the first data group; determining the reception status of the first data group based on the data packets received during the first time period and the data packets received during the second time period. The first time period precedes the second time period.

In one embodiment, a packet header of each data packet transmitted by the second device comprises a fourth region configured to represent whether the second device is transmitting one or more data packets to the first device in the block transmission during a current time interval. When the second device transmits the data packets in the block transmission to the first device at the current time interval, each data packet transmitted by the second device at the current time interval further comprises at least one of: a fifth region, a six region and a seventh region.

The fifth region is configured for representing a total number of data packets transmitted by the second device during the current time interval. The sixth region is configured for representing a first sequence number of this data packet, the first sequence number is determined based on a chronological order in which this data packet was first transmitted by the second device. The seventh region is configured to represent a second sequence number of this data packet, the second sequence number is determined based on a chronological order in which this data packet was transmitted during the current time interval.

In one embodiment, the second device communicates wirelessly with the first device based on an extended block acknowledgement link. The data packet transmitted by the second device is generated based on BLE CIS PDU, and the packet header of the data packet further comprises: a logical link identifier configured for identify a load type of this data packet; a close isochronous event identifier configured for identify whether the isochronous event is closed; a Null PDU indicator configured for identify whether this data packet carries data; and a load length identifier configured to identify a load length of this data packet.

Optionally, the processor 1100 is further used to execute the program in the memory 1120 to perform the following operations: determining the data packets in the second data group based on the target mapping table and a maximum number of data packets that can be transmitted during a current time interval when the second device successfully receives the target mapping table; determining the second data group based on the maximum number of data packets that can be transmitted during the current time interval when the second device does not successfully receive the target mapping table.

Optionally, the processor 1100 is further used to execute the program in the memory 1120 to perform the following operations: determining the data packets in the second initial data group, wherein the number of data packets in the second initial data group is less than or equal to the maximum number of data packets that can be transmitted during the current time interval; selecting a portion of the data packets transmitted by the second device before the second time interval but not successfully received by the first device as the data packets in the second retransmission data group when the number of data packets in the second initial data group is less than the maximum number of data packets that can be transmitted in the current time interval.

Optionally, the processor 1100 is further used to execute the program in the memory 1120 to perform the following operations: transmitting a first data group to the first device during a first time interval. The first data group comprises a first initial data group and/or a first retransmission data group. The first initial data group comprises one or more first data packets that have not been transmitted by the second device before the first time interval, and the first retransmission data group comprises one or more second data packets comprising at least a portion of one or more data packets transmitted by the second device before the first time interval that were not successfully received by the first device.

Optionally, the processor 1100 is further used to execute the program in the memory 1120 to perform the following operations: transmitting all data packets in the second data group to the first device during a first time period in the second time interval via the transceiver 1110; performing a second pre-retransmission operation comprising retransmitting at least some of the data packets of the second data group to the first device during a second time period in the second time interval. The first time period is located before the second time period.

Optionally, each of the data packets in the second data group is provided with a first sequence number being determined based on a chronological order in which the data packets were first sent. The second pre-retransmission operation further comprises: transmitting the first X data packets in the second data group in an ascending order of the first sequence number during the second time period, X is a positive integer and is determined based on the maximum number of data packets that can be transmitted during the current time interval, and the number of data packets transmitted during the first time period.

Optionally, the processor 1100 is further used to execute the program in the memory 1120 to perform the following operations: obtaining N third data packets from a transmitting cache to obtain the second initial data group, and obtaining M fourth data packets from the transmitting cache to obtain the second retransmission data group. N and M are natural numbers and $M+N \leq K$, and K is the maximum number of data packets that can be transmitted by the second device during the current time interval optionally, the target mapping table comprises a plurality of bits, the reception status of one data packet occupies one of the bits, wherein the number of occupied bits of the target mapping table is T1 and the number of unoccupied bits of the target mapping table is T2, T1 and T2 being natural numbers, and $N \leq T2$.

The electronic device provided according to one embodiment of the present invention can perform the above method with similar implementation principles and technical effects, which will not be repeated herein in this embodiment.

A readable storage medium provided according to one embodiment of the present invention is configured for storing a program, the program being executable by a processor to implement the individual operations in the method as shown in FIG. 1, or to implement the individual operations in the method as shown in FIG. 3.

Those skilled in the art should be aware that the embodiments of this application may be methods, systems, or computer program products. Accordingly, the present invention may take the form of a complete hardware embodiment, a complete software embodiment, or an embodiment in conjunction with software and hardware aspects. Furthermore, the present invention may take the form of a computer program product implemented on one or more computer-available storage media (comprising, but not limited to, disk memory, CD-ROM, optical memory, etc.) containing computer-available program code.

The present invention is described with reference to methods, equipment (systems), and flow charts and/or block diagrams of computer program products according to the embodiment of the present invention. It should be understood that each flow and/or block in a flowchart and/or block diagram, as well as the combination of flow and/or block in a flowchart and/or block diagram, can be implemented by computer program instructions. These computer program instructions may be provided to a processor of a general purpose computer, a dedicated computer, an embedded processor, or other programmable data processing device to produce a machine such that instructions executed by a processor of a computer or other programmable data processing device produce instructions for implementing a flow chart or more. A device for processes and/or block diagrams or functions specified in a box or multiple boxes.

These computer program instructions may also be stored in a computer-readable memory that may guide a computer or other programmable data processing device to work in a particular way, such that the instructions stored in the computer-readable memory generate a manufacturer comprising an instruction device that is implemented in a flow chart one or more processes. Process and/or block diagram, a box or function specified in multiple boxes.

These computer program instructions may also be loaded on a computer or other programmable data processing device such that a series of operational operations are performed on a computer or other programmable device to produce computer-implemented processing, thereby providing instructions executed on a computer or other programmable device for implementing a flow chart. The operations of a process or multiple processes and/or block diagrams, or functions specified in a box.

Although preferred embodiments of the present invention have been described, additional changes and modifications to these embodiments may be made once the basic creative concepts are known to those skilled in the art. The appended claims are therefore intended to be interpreted to comprise preferred embodiments and all changes and modifications falling within the scope of this application.

Obviously, a person skilled in the art may make various changes and variations to the application without departing from the spirit and scope of the application. Thus, if these modifications and variations of this application fall within the scope of the claims and their equivalent technologies, the application is also intended to comprise these changes and variations.

I claim:

1. A data transmission method, applied to a first device, comprising:

receiving a first data group transmitted by a second device during a first time interval, the first data group comprising a first initial data group and/or a first retransmission data group, wherein the first initial data group comprises one or more first data packets that have not been transmitted by the second device before the first time interval, and the first retransmission data group comprises one or more second data packets comprising at least a portion of one or more data packets transmitted by the second device before the first time interval that were not successfully received by the first device;

generating a target mapping table based on a reception status of the first data group and a reception status of the data packets transmitted by the second device before the first time interval, wherein at least one of the reception status of the first data group and the reception status of the data packets transmitted by the second device before the first time interval comprises a failed reception status;

storing the target mapping table in a packet header of an acknowledgement packet, wherein the acknowledgement packet is generated according to a Bluetooth Low Energy (BLE) protocol; and transmitting the acknowledgement packet comprising the packet header comprising the target mapping table to the second device within the first time interval, wherein each data packet transmitted by the second device to the first device is provided with a first sequence number being determined based on a chronological order in which the data packet was first transmitted by the second device, the packet header of the acknowledgement packet comprises a first region configured to represent whether the first device confirms the reception status of the data packets to the second device by an extended block acknowledgement within a current time interval, wherein the first device communicates wirelessly with the second device based on an extended block acknowledgement link;

the acknowledgement packet is generated based on a Bluetooth low energy BLE connected isochronous stream CIS protocol data unit PDU, and the packet header of the acknowledgement packet comprises:

a logical link identifier configured to identify a load type of this data packet;

a close isochronous event identifier configured to identify whether the isochronous event is closed;

a Null PDU indicator configured to identify whether this data packet carries data;

and a load length identifier configured to identify a load length of this data packet, and wherein when the first device confirms the reception status of the data packet to the second device by the extended block acknowledgement within the current time interval, the packet header of the acknowledgement packet further comprises:

a second region configured to represent a target sequence number; and a third region for storing the target mapping table comprising the reception status of the data packets in an ascending order of the first sequence number from the target sequence number, wherein the target sequence number is a minimum value of the first sequence numbers corresponding to the data packets whose reception status is the failed reception.

2. The data transmission method according to claim 1, wherein the reception status further comprises a successful reception.

3. The data transmission method according to claim 1, wherein after the transmitting the target mapping table to the second device within the first time interval, the method further comprises: performing a first pre-retransmission operation comprising retransmitting the target mapping table at least once to the second device.

4. The data transmission method according to claim 1, wherein said receiving a first data group transmitted by a second device during a first time interval comprises:

receiving all data packets in the first data group transmitted by the second device during a first time period in the first time interval;

receiving one or more data packets retransmitted by the second device during a second time period in the first time interval, wherein the retransmitted data packets are at least some of the data packets in the first data group;

determining the reception status of the first data group based on the data packets received during the first time period and the data packets received during the second time period, wherein the first time period precedes the second time period.

5. A data transmission method, applied to a second device, comprising:

receiving an acknowledgement packet comprising a packet header comprising a target mapping table from a first device, the target mapping table being generated based on a reception status of a first data group and a reception status of one or more data packets transmitted by the second device before a first time interval, wherein at least one of the reception status of the first data group and the reception status of the data packets transmitted by the second device before the first time interval comprises a failed reception status, wherein the acknowledgement packet is generated according to a Bluetooth Low Energy (BLE) protocol;

transmitting a second data group to the first device during a second time interval being after the first time interval, the second data group comprising a second initial data group and/or a second retransmission data group, wherein the second initial data group comprises one or more third data packets that have not been transmitted by the second device before the second time interval, the second retransmission data group comprises one or more fourth data packets comprising at least some of the data packets transmitted by the second device which were not successfully received by the first device before the second time interval and/or at least some of the data packets of the first data group which were not successfully received by the first device, wherein a packet header of each data packet transmitted by the second device comprises a fourth region configured to represent whether the second device is transmitting one or more data packets to the first device in a block transmission during a current time interval; when the second device transmits the data packets in the block transmission to the first device at the current time interval, each data packet transmitted by the second device at the current time interval further comprising:

a fifth region configured for representing a total number of data packets transmitted by the second device during the current time interval; and at least one of:

a sixth region configured for representing a first sequence number of this data packet, the first sequence number being determined based on a chronological order in which this data packet was first transmitted by the second device; or a seventh region configured to represent a second sequence number of this data packet, the second sequence number being determined based on a chronological order in which this data packet was transmitted during the current time interval.

6. The data transmission method according to claim 5, wherein the second device communicates wirelessly with the first device based on an extended block acknowledgement link;

the data packet transmitted by the second device is generated based on BLE CIS PDU, and the packet header of the data packet further comprises:

a logical link identifier configured for identifying a load type of this data packet;

a close isochronous event identifier configured for identifying whether the isochronous event is closed;

a Null PDU indicator configured for identifying whether this data packet carries data;

and a load length identifier configured to identify a load length of this data packet.

7. The data transmission method according to claim 5, wherein, after the receiving a target mapping table from a first device, the method further comprises:

determining the data packets in the second data group based on the target mapping table and a maximum number of data packets that can be transmitted during a current time interval when the second device successfully receives the target mapping table;

determining the second data group based on the maximum number of data packets that can be transmitted during the current time interval when the second device does not successfully receive the target mapping table;

wherein the determining the second data group based on the maximum number of data packets that can be transmitted during the current time interval, comprises:

determining the data packets in the second initial data group, wherein the number of data packets in the second initial data group is less than or equal to the maximum number of data packets that can be transmitted during the current time interval;

selecting a portion of the data packets transmitted by the second device before the second time interval but not successfully received by the first device as the data packets in the second retransmission data group when the number of data packets in the second initial data group is less than the maximum number of data packets that can be transmitted in the current time interval.

8. The data transmission method according to claim 5, wherein, before the receiving a target mapping table from a first device, the method further comprises:

transmitting a first data group to the first device during a first time interval, the first data group comprising a first initial data group and/or a first retransmission data group, wherein the first initial data group comprises one or more first data packets that have not been transmitted by the second device before the first time interval, and the first retransmission data group comprises one or more second data packets comprising at least a portion of one or more data packets transmitted by the second device before the first time interval that were not successfully received by the first device.

9. The data transmission method according to claim 5, wherein the transmitting a second data group to the first device during a second time interval, comprises:

transmitting all data packets in the second data group to the first device during a first time period in the second time interval;

performing a second pre-retransmission operation comprising retransmitting at least some of the data packets of the second data group to the first device during a second time period in the second time interval;

wherein the first time period is located before the second time period.

10. The data transmission method according to claim 9, wherein each of the data packets in the second data group is provided with a first sequence number being determined based on a chronological order in which the data packets were first sent;

the second pre-retransmission operation further comprises:

transmitting the first X data packets in the second data group in an ascending order of the first sequence number during the second time period, X being a positive integer and being determined based on the maximum number of data packets that can be transmitted during the current time interval, and the number of data packets transmitted during the first time period.

11. The data transmission method according to claim 5, wherein before transmitting a second data group to the first device during the second time interval, the method further comprises:

obtaining N third data packets from a transmitting cache to obtain the second initial data group, and obtaining M fourth data packets from the transmitting cache to obtain the second retransmission data group;

wherein N and Mare natural numbers and $M+N \leqslant K$, and K is the maximum number of data packets that can be transmitted by the second device during the current time interval.

12. The method according to claim 11, wherein the target mapping table comprises a plurality of bits, the reception status of each data packet occupies one of the bits, wherein the number of occupied bits of the target mapping table is T1 and the number of unoccupied bits of the target mapping table is T2, T1 and T2 being natural numbers, and $N \leqslant T2$.

13. A data transmission device used as a first device, comprising a processor to:

receive a first data group transmitted by a second device during a first time interval, the first data group comprising a first initial data group and/or a first retransmission data group, wherein the first initial data group comprises one or more first data packets that have not been transmitted by the second device before the first time interval, and the first retransmission data group comprises one or more second data packets comprising at least a portion of one or more data packets transmitted by the second device before the first time interval that were not successfully received by the first device;

generate a target mapping table based on a reception status of the first data group and a reception status of the data packets transmitted by the second device before the first time interval, wherein at least one of the reception status of the first data group and the reception status of the data packets transmitted by the second device before the first time interval comprises a failed reception status;

store the target mapping table in a packet header of an acknowledgement packet, wherein the acknowledgement packet is generated according to a Bluetooth Low Energy (BLE) protocol; and transmit the acknowledgement packet comprising the packet header comprising the target mapping table to the second device within the first time interval, wherein the first device communicates wirelessly with the second device based on an extended block acknowledgement link;

the acknowledgement packet is generated based on a Bluetooth low energy BLE connected isochronous stream CIS protocol data unit PDU, and the packet header of the acknowledgement packet comprises:

a logical link identifier configured to identify a load type of this data packet;

a close isochronous event identifier configured to identify whether the isochronous event is closed;

a Null PDU indicator configured to identify whether this data packet carries data;

and a load length identifier configured to identify a load length of this data packet, and wherein each data packet transmitted by the second device to the first device is provided with a first sequence number being determined based on a chronological order in which the data packet was first transmitted by the second device, the packet header of the acknowledgement packet comprises a first region configured to represent whether the first device confirms the reception status of the data packets to the second device by an extended block acknowledgement within a current time interval, wherein when the first device confirms the reception status of the data packet to the second device by the extended block acknowledgement within the current time interval, the packet header of the acknowledgement packet further comprises:

a second region configured to represent a target sequence number; and a third region for storing the target mapping table comprising the reception status of the data packets in an ascending order of the first sequence number from the target sequence number, wherein the target sequence number is a minimum value of the first sequence numbers corresponding to the data packets whose reception status is the failed reception.

14. The data transmission device according to claim 13, wherein the reception status further comprises a successful reception.

15. The data transmission device according to claim 13, wherein to receive the first data group, the processor is further to: receive all data packets in the first data group transmitted by the second device during a first time period in the first time interval; receive one or more data packets retransmitted by the second device during a second time period in the first time interval, wherein the retransmitted data packets are at least some of the data packets in the first data group, and a first determination unit for determining the reception status of the first data group based on the data packets received during the first time period and the data packets received during the second time period, wherein the first time period precedes the second time period.

* * * * *